(12) United States Patent
Davatzikos et al.

(10) Patent No.: US 9,984,283 B2
(45) Date of Patent: May 29, 2018

(54) METHODS, SYSTEMS, AND COMPUTER READABLE MEDIA FOR AUTOMATED DETECTION OF ABNORMALITIES IN MEDICAL IMAGES

(71) Applicant: The Trustees of the University of Pennsylvania, Philadelphia, PA (US)

(72) Inventors: Christos Davatzikos, Philadelphia, PA (US); Ke Zeng, Philadelphia, PA (US); Ali Guray Erus, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 275 days.

(21) Appl. No.: 15/044,928

(22) Filed: Feb. 16, 2016

(65) Prior Publication Data

US 2016/0239969 A1 Aug. 18, 2016

Related U.S. Application Data

(60) Provisional application No. 62/116,410, filed on Feb. 14, 2015.

(51) Int. Cl.
*G06K 9/00* (2006.01)
*G06T 7/00* (2017.01)
(Continued)

(52) U.S. Cl.
CPC ....... *G06K 9/00288* (2013.01); *G06K 9/6247* (2013.01); *G06K 9/6284* (2013.01);
(Continued)

(58) Field of Classification Search
CPC ....... G06T 7/0012; G06T 7/0016; G06T 7/11; G06T 7/337; G06T 7/0014;
(Continued)

(56) References Cited

U.S. PATENT DOCUMENTS 6,996,549 B2 * 2/2006 Zhang ................... G06K 9/623
706/12
7,088,850 B2 * 8/2006 Wei ....................... G06T 7/0012
382/128

(Continued)

OTHER PUBLICATIONS

Aljabar, et al., "Multi-atlas based segmentation of brain images: Atlas selection and its effect on accuracy", NeuroImage, vol. 46 (2009), pp. 726-738.

(Continued)

*Primary Examiner* — Manav Seth
(74) *Attorney, Agent, or Firm* — Jenkins, Wilson, Taylor & Hunt, P.A.

(57) ABSTRACT

Methods, systems, and computer readable media for automated detection of abnormalities in medical images are disclosed. According to a method for automated abnormality detection, the method includes receiving a target image. The method also includes deformably registering to the target image or to a common template a subset of normative images from a plurality of normative images, wherein the subset of normative images is associated with a normal variation of an anatomical feature. The method further includes defining a dictionary using the subset of normative images. The method also includes decomposing, using sparse decomposition and the dictionary, the target image. The method further includes classifying one or more voxels of the target image as normal or abnormal based on results of the sparse decomposition.

22 Claims, 15 Drawing Sheets

(51) Int. Cl.
  *G06K 9/62* (2006.01)
  *G06T 7/33* (2017.01)
  *G06K 9/46* (2006.01)
(52) U.S. Cl.
  CPC .......... *G06T 7/0012* (2013.01); *G06T 7/0014* (2013.01); *G06T 7/0016* (2013.01); *G06T 7/337* (2017.01); *G06K 2009/4695* (2013.01); *G06T 2207/10088* (2013.01); *G06T 2207/20081* (2013.01); *G06T 2207/30016* (2013.01)
(58) Field of Classification Search
  CPC . G06T 2207/10088; G06T 2207/20081; G06T 2207/30016; G06K 9/6247; G06K 9/6284; G06K 2009/4695; G06K 9/6249; G06K 9/624; G06K 9/00906; G06K 9/00268; G06K 9/0027; G06K 2009/363; G06K 9/00228; G06K 9/00281; G06K 9/00288; G06K 9/6268; G06K 9/6293; G06K 9/64
  See application file for complete search history.

(56) References Cited

U.S. PATENT DOCUMENTS

| | | | | |
|---|---|---|---|---|
| 7,298,881 | B2* | 11/2007 | Giger | G06T 7/0012 128/922 |
| 7,492,931 | B2* | 2/2009 | Sabol | A61B 5/055 382/128 |
| 7,738,683 | B2* | 6/2010 | Cahill | G06T 7/0012 382/128 |
| 8,015,125 | B2* | 9/2011 | Regli | G06F 15/18 706/12 |
| 8,223,143 | B2* | 7/2012 | Dastmalchi | A61B 3/102 345/418 |
| 8,266,079 | B2* | 9/2012 | Regli | G06F 15/18 706/12 |
| 8,406,525 | B2* | 3/2013 | Ma | G06K 9/00275 382/159 |
| 8,463,073 | B2* | 6/2013 | Ma | G06K 9/6249 382/289 |
| 8,768,046 | B2* | 7/2014 | Ernst | G06T 7/251 382/154 |
| 8,781,210 | B2* | 7/2014 | Scheid | G06T 7/001 382/145 |
| 9,224,210 | B2* | 12/2015 | Epstein | G01R 33/56308 |
| 9,466,108 | B1* | 10/2016 | Chen | G06T 11/60 |
| 2002/0057826 | A1* | 5/2002 | Imamura | G06T 5/20 382/128 |
| 2008/0292194 | A1* | 11/2008 | Schmidt | G06T 7/0012 382/217 |
| 2011/0064302 | A1* | 3/2011 | Ma | G06K 9/00275 382/159 |
| 2017/0140534 | A1* | 5/2017 | Chen | G06T 7/0014 |

OTHER PUBLICATIONS

Andersen, et al., "Cost function masking during normalization of brains with focal lesions: Still a necessity?", NeuroImage, vol. 53 (2010), pp. 78-84.
Boyd, et al., "Distributed optimization and statistical learning via the alternating direction method of multipliers", Foundations and Trends® in Machine Learning, vol. 3, No. 1 (2011), pp. 1-122.
Brett, et al., "Spatial normalization of brain images with focal lesions using cost function masking", NeuroImage, vol. 14 (2001), pp. 486-500.
Chen, et al., "Atomic decomposition by basis pursuit", Society for Industrial and Applied Mathematics (SIAM) Review, vol. 43, No. 1 (2001), pp. 129-159.
Choi, et al., "Injectivity conditions of 2D and 3D uniform cubic B-spline functions", Graphical Models, vol. 62 (2000), pp. 411-427.
Crawford, et al., "Testing for suspected impairments and dissociations in single-case studies in neuropsychology: evaluation of alternatives using Monte Carlo simulations and revised tests for dissociations", Neuropsychology, vol. 19, No. 3 (2005), pp. 318-331.
Elad, et al., "On the role of sparse and redundant representations in image processing", Proceedings of the IEEE, vol. 98, No. 6 (2010), pp. 972-982.
Erus, et al., "Individualized statistical learning from medical image databases: Application to identification of brain lesions", Medical Image Analysis, vol. 18 (2014), pp. 542-554.
Fonov, et al., "Unbiased average age-appropriate atlases for pediatric studies", NeuroImage, vol. 54 (2011), pp. 313-327.
García-Lorenzo, et al., "Review of automatic segmentation methods of multiple sclerosis white matter lesions on conventional magnetic resonance imaging", Medical Image Analysis, vol. 17 (2013), pp. 1-18.
Gillebert, et al., "Automated delineation of stroke lesions using brain CT images", NeuroImage: Clinical, vol. 4 (2014), pp. 540-548.
Goldszal, et al., "An Image-Processing System for Qualitative and Quantitative Volumetric Analysis of Brain Images," Journal of Computer Assisted Tomography, vol. 22, No. 5 (1998), pp. 827-837.
Gooya, et al., "GLISTR: Glioma image segmentation and registration", IEEE Transactions on Medical Imaging, (2011), pp. 1-15.
Gordillo, et al., "State of the art survey on MRI brain tumor segmentation", Magnetic Resonance Imaging, vol. 31 (2013), pp. 1426-1438.
Harmouche, et al., "Probabilistic multiple sclerosis lesion classification based on modeling regional intensity variability and local neighborhood information", IEEE Transactions on Biomedical Engineering, vol. 62, No. 5 (2015), pp. 1281-1292.
Konukoglu, et al., "Image guided personalization of reaction-diffusion type tumor growth models using modified anisotropic eikonal equations", IEEE Transactions on Medical Imaging, vol. 29, No. 1 (2010), pp. 77-95.
Lee et al., "Learning the parts of objects by non-negative matrix factorization", Nature, vol. 401 (1999), pp. 788-791.
Li et al., "A Sparse Representation-Based Algorithm for Pattern Localization in Brain Imaging Data Analysis," PLoS One, vol. 7, No. 12, e50332 (2012), pp. 1-12.
Li, et al., "Registration of images with varying topology using embedded maps", IEEE Transactions on Medical Imaging, vol. 31, No. 3 (2012), pp. 749-765.
Mourão-Miranda, et al., "Patient classification as an outlier detection problem: An application of the one-class support vector machine", NeuroImage, vol. 58 (2011), pp. 793-804.
Ou, et al., "Comparative evaluation of registration algorithms in different brain databases with varying difficulty: Results and insights", IEEE Transactions on Medical Imaging, vol. 33, No. 10 (2014), pp. 2039-2065.
Ou, et al., "DRAMMS: Deformable registration via attribute matching and mutual-saliency weighting", Medical Image Analysis, vol. 15 (2011), pp. 622-639.
Paatero, et al., "Positive matrix factorization: A non-negative factor model with optimal utilization of error estimates of data values", Environmetrics, vol. 5 (1994), pp. 111-126.
Periaswamy, et al., "Medical image registration with partial data", Medical Image Analysis, vol. 10 (2006), pp. 452-464.
Prastawa, et al., "A brain tumor segmentation framework based on outlier detection", Medical Image Analysis, vol. 8 (2004), pp. 275-283.
Samar, et al., "Distributed estimation via dual decomposition", Proceedings of the European Control Conference (2007), pp. 1511-1519.
Shen, et al., "Detection of infarct lesions from single MRI modality using inconsistency between voxel intensity and spatial location—a 3-D automatic approach", IEEE Transactions on Information Technology in Biomedicine, vol. 12, No. 4 (2008), pp. 532-540.

(56) References Cited

OTHER PUBLICATIONS

Sotiras, et al., "Finding imaging patterns of structural covariance via non-negative matrix factorization", NeuroImage, vol. 108 (2015), pp. 1-16.
Swanson, et al., "Virtual and real brain tumors: using mathematical modeling to quantify glioma growth and invasion", Journal of the Neurological Sciences, vol. 216 (2003), pp. 1-10.
Trouvé, et al., "Metamorphoses through lie group action", Foundations of Computational Mathematics, vol. 5 (2005), pp. 173-198.
van der Lijn, et al., "Hippocampus segmentation in MR images using atlas registration, voxel classification, and graph cuts", NeuroImage, vol. 43 (2008), pp. 708-720.
Wright, et al., "Dense error correction via L1-minimization", IEEE International Conference on Acoustics, Speech and Signal Processing (2009), ICASSP 2009, pp. 3033-3036.
Wright, et al., "Robust face recognition via sparse representation", IEEE Transactions on Pattern Analysis and Machine Intelligence, vol. 31, No. 2 (2009), pp. 210-227.
Zacharaki, et al., "Abnormality segmentation in brain images via distributed estimation", IEEE Transactions on Information Technology in Biomedicine, vol. 16, No. 3 (2012), pp. 330-338.
Zhang, et al., "Necessary and sufficient conditions of solution uniqueness in 1-norm minimization", Journal of Optimization Theory and Applications, vol. 164 (2015), pp. 109-122.

\* cited by examiner

METHODS, SYSTEMS, AND COMPUTER READABLE MEDIA FOR AUTOMATED DETECTION OF ABNORMALITIES IN MEDICAL IMAGES

PRIORITY CLAIM

This application claims the benefit of U.S. Provisional Patent Application Ser. No. 62/116,410 filed Feb. 14, 2015; the disclosure of which is incorporated herein by reference in its entirety.

GOVERNMENT INTEREST

This invention was made with government support under Grant No. RO1 EB009234 awarded by the National Institutes of Health. The government has certain rights in the invention.

TECHNICAL FIELD

The subject matter described herein relates to medical data analysis. More specifically, the subject matter relates to methods, systems, and computer readable media for automated detection of abnormalities in medical images.

BACKGROUND

Automated detection of lesions and other abnormalities in medical images is of key interest. As manual delineation of the pathological regions is time-consuming and suffers from large intra- and inter-expert variability, extensive efforts have been devoted to the development of fully automatic methods which could reduce both processing time and rater (e.g., human related) variability.

Accordingly, a need exists for improved methods, systems, and computer readable media for automated detection of abnormalities in medical images.

SUMMARY

Methods, systems, and computer readable media for automated detection of abnormalities in medical images are disclosed. According to a method for automated abnormality detection, the method includes receiving a target image. The method also includes deformably registering to the target image or to a common template a subset of normative images from a plurality of normative images, wherein the subset of normative images is associated with a normal variation of an anatomical feature. The method further includes defining a dictionary using the subset of normative images. The method also includes decomposing, using sparse decomposition and the dictionary, the target image. The method further includes classifying one or more voxels of the target image as normal or abnormal based on results of the sparse decomposition.

According to another method for automated abnormality detection, the method includes receiving a target image, deformably registering to the target image or to a common template a subset of images from a plurality of images, wherein the subset of images is associated with a normal variation of an imaging signal, such as an anatomical or functional image, defining a dictionary based on the registered normative images, using sparse decomposing to attempt to decompose the target image into a normal part plus a residual, soft and/or hard classifying each voxel of the target image as normal or abnormal based on results of the sparse decomposition, and re-iterating the procedure when necessary.

According to a system for automated abnormality detection, the system includes a computing platform. The computing platform includes at least one processor and memory. The computing platform comprises an abnormality detection module utilizing the at least one processor and the memory. The abnormality detection module is configured to receive a target image, to deformably register to the target image or to a common template a subset of normative images from a plurality of normative images, wherein the subset of normative images is associated with a normal variation of an anatomical feature, to define a dictionary using the subset of normative images, to decompose, using sparse decomposition and the dictionary, the target image, and to classify one or more voxels of the target image as normal or abnormal based on results of the sparse decomposition.

According to another system for automated abnormality detection, the system includes a computing platform. The computing platform includes at least one processor and memory. The system also includes an abnormality detection module utilizing the at least one processor and the memory. The abnormality detection module is configured to receive a target image, to deformably register to the target image a subset of images from a plurality of images, wherein the subset of images is associated with a normal variation of an anatomical feature, to define a dictionary from the registered normative images, to use the dictionary in a sparse decomposition that attempts to decompose the target image into a normal part plus a residual, to soft/hard classify each voxel of the target image as normal or abnormal based on results of the sparse decomposition, and to re-iterate the procedure of registration and abnormality detection, by progressively increasing the degree of flexibility/elasticity in deforming source to target images. Initial steps use conservative (i.e. not highly deformable) registration, in order to avoid fitting the lesion itself. As the confidence in the location and extent of the abnormality is increased gradually, this estimated abnormal region is excluded from the registration process, and increasingly deformable registration is applied, interleaved with finer and finer abnormality detection. This process is iterated until convergence (e.g., when no additional change is induced by this procedure).

The subject matter described herein may be implemented in software in combination with hardware and/or firmware. For example, the subject matter described herein may be implemented in software executed by at least one processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with references to the accompanying drawings of which.

DETAILED DESCRIPTION

The subject matter described herein relates to methods, systems, and computer readable media for automated detection of abnormalities in medical images. In accordance with some aspects of the subject matter described herein, methods, mechanisms, and/or techniques are provided for automatically detecting abnormalities (e.g., pathological regions) in brain magnetic resonance images (MRIs) and/or other medical images. For example, one exemplary algorithm may decompose an image, or a function defined on an image grid, into a superposition of a normal part and a residual term. The decomposition may be performed in a principled way so that the normal part fits a statistical model representing normative anatomical variations among a healthy population, while the residual term absorbs pathological patterns which may then be identified via a statistical test. In this example, an iterative framework may be applied to the image and the log Jacobian determinant of the deformation field in a hierarchically fashion, gradually improving accuracy of the registration and precision of the detection along the hierarchy.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
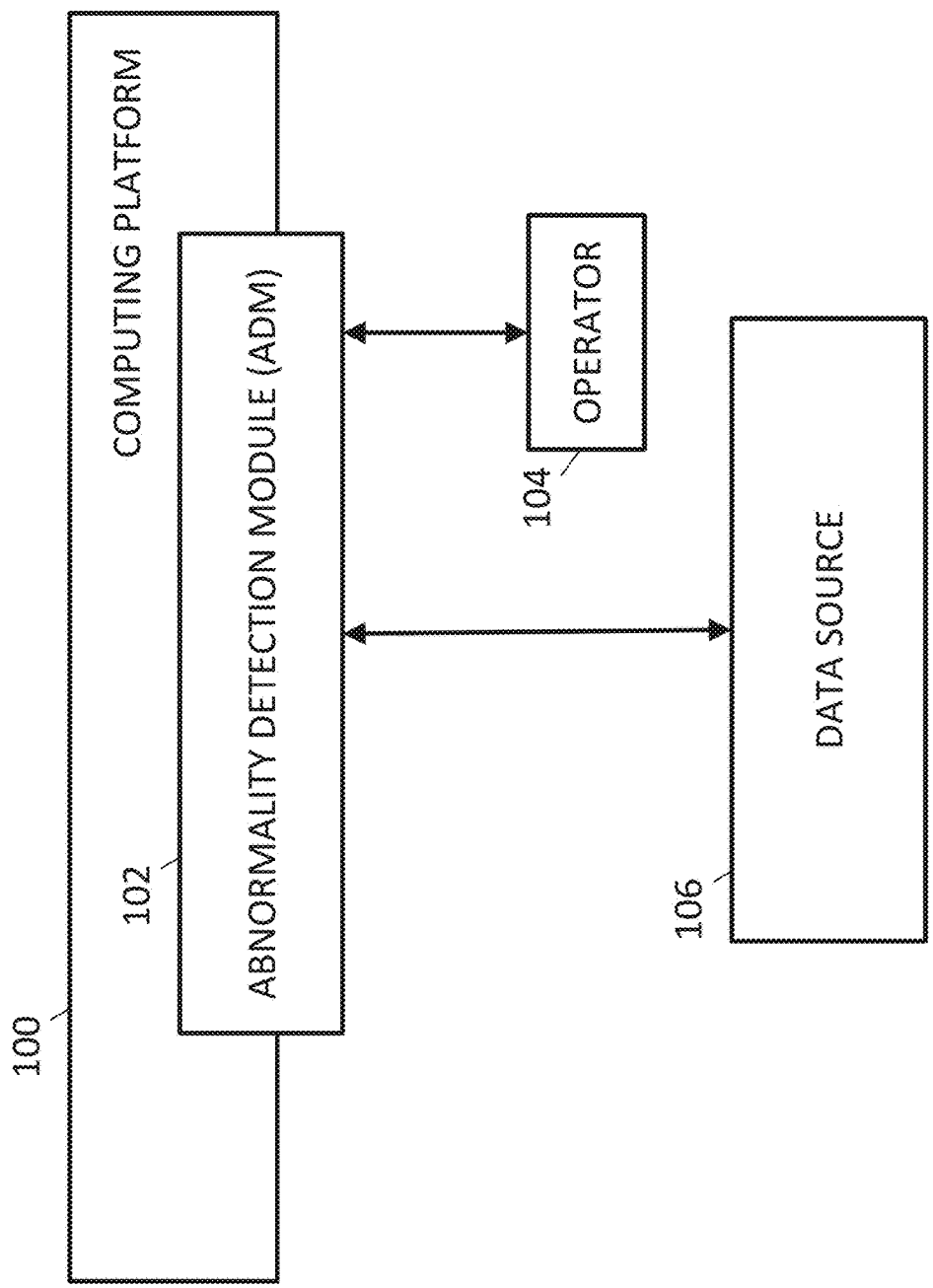
FIG. 1 is a diagram illustrating an exemplary computing platform for automated abnormality detection according to an embodiment of the subject matter described herein.

FIG. 1 is a diagram illustrating an exemplary computing platform 100 for automated abnormality detection according to an embodiment of the subject matter described herein. Computing platform 100 may represent any suitable entity or entities (e.g., a medical device, a phone, a tablet computer, or a laptop) for analyzing medical images and/or for detecting abnormalities (e.g., pathological regions) in the medical images. Exemplary medical images that may be analyzed for abnormalities may include a two dimensional (2D) image, a projectional radiograph (x-ray), a tomogram, an ultrasound image, a thermal image, an echocardiogram, an MRI, a three dimensional (3D) image, a computed tomography (CT) image, a photoacoustic image, an elastography image, a tactile image, a positron emission tomography (PET) image, or a single-photon emission computed tomography (SPECT) image.

In some embodiments, computing platform 100 may be configured to perform one or more aspects associated with automated abnormality detection in medical images. For example, computing platform 100 and/or a related module may receive a target image, e.g., an MR image of a brain. In this example, computing platform 100 may be configured to analyze the target image by using sparse decomposition and a set of normative images spatially aligned with the target image (e.g., MR images of a normal or healthy brain) to decompose the target image into a normal component and a residual component. Continuing with this example, computing platform 100 may be configured to further determining whether the residual component includes an abnormality based on a statistical test.

In some embodiments, computing platform 100 may be a stand-alone tool, a medical device, or software executing on one or more processors. In some embodiments, computing platform 100 may be a single node or may be distributed across multiple computing platforms or nodes.

Computing platform 100 may include an abnormality detection module (ADM) 102. ADM 102 may be any suitable entity or entities (e.g., software executing on one or more processors) for performing one or more aspects associated with analyzing medical images and/or for detecting abnormalities (e.g., pathological regions) in medical images. For example, ADM 102 may include and/or use multiple processors, potentially working concurrently or in parallel, to deform a plurality of normative templates to a patient's scan. In some embodiments, ADM 102 may include one or more communications interfaces for interacting with users (e.g., operator 104) and/or nodes (e.g., data source 106).

In some embodiments, ADM 102 may include functionality for defining a dictionary of images from a plurality of images representing normative anatomical and/or functional variations among a healthy population for various biological systems and/or anatomical features. For example, ADM 102 may access a data storage containing a plurality of training samples (e.g., images of various portions of various biological systems, such as a skeletal system, a muscular system, an integumentary system, a nervous system, a cardiovascular system, an endocrine system, a respiratory system, a urinary system, an excretory system, a reproductive system, a digestive system, a lymphatic system, a brain, a stomach, a heart, a lung, a bladder, a liver, a kidney, skin, an eye, a bone, an organ, or other body part).

In some embodiments, ADM 102 may include functionality for spatially aligning (registering) to the target image a subset of images representing normative anatomical and/or functional variations, or for spatially aligning the target image and the normative subsets to a common template. For example, assuming an image of a left cardiac ventricle is to be analyzed, ADM 102 may register a subset of images representing normative cardiac ventricle variations to the target image. ADM 102 may also register the target image and the normative subset to a common template for the left cardiac ventricle.

In some embodiments, ADM 102 may include functionality for defining a dictionary of images representing normative anatomical and/or functional variations associated with a target medical image, and such a dictionary is generated from a subset of images that have been spatially aligned to the target image, or to a common template.

In some embodiments, ADM 102 may include functionality for using sparse decomposition to attempt to decompose a target image using a dictionary. For example, ADM 102 may be configured to use l1-norm minimization for determining a normal component and a residual component in a target image.

In some embodiments, ADM 102 may include functionality for classifying each voxel of the target image as normal or abnormal based on results of the sparse decomposition. For example, using sparse decomposition and/or statistical information, ADM 102 may be configured to identify one or more abnormalities associated with a residual component of a target image. In this example, the one or more abnormalities may be identified based on an abnormality map, e.g., a quantitative measure of the abnormality level for the target image generated from a statistical test on the residual component of the decomposition.

In some embodiments, ADM 102 may include functionality for incorporating the decomposition and/or classification results into another round of spatial alignment (registration). For example, regions classified as abnormal by ADM 102 may be neglected to improve registration accuracy.

In some embodiments, ADM 102 may include functionality for re-defining a dictionary from the re-aligned normative subset. ADM 102 may also update the decomposition and/or classification results based on the re-defined dictionary.

In some embodiments, ADM 102 may include functionality for performing additional round(s) of registration, dictionary construction, sparse decomposition, and statistical classification.

Operator 104 may be an automated system or may be controlled or controllable by a human user. Operator 104 may select and/or configure one or more components or portions of ADM 102 and/or may use information obtained, gathered, or derived by ADM 102. For example, operator 104 may analyze detection results from ADM 102 and may determine whether analyzed medical images required further processing and/or additional review, e.g., by a physician or human expert.

Data source 106 may be any suitable entity or entities (e.g., an imaging device, a medical records system, a storage device, etc.) for providing or acquiring medical images. In some embodiments, medical images and/or other data for analysis may be gathered and/or received by data source 106. For example, an MRI device may generate MRIs and may send the MRIs to data source 106 which may be communicatively connected to computing platform 100 or modules therein. In another example, data source 106 may represent an imaging device and may provide images directly to computing platform 100. In yet another example, data source 106 may represent a database system, a memory, or a storage device (e.g., a flash drive) containing one or more images. In this example, computing platform 100 or modules therein may be configured to obtain or retrieve the images from data source 106.

In some embodiments, ADM 102 may include or access data storage containing information related to analyzing medical images and/or identification of abnormalities in medical images. Exemplary data storage may include non-transitory computer readable media, such as flash memory, random access memory, or other storage devices. In some embodiments, data storage may be external to and/or or integrated with computer platform 100 and/or ADM 102.

Additional information regarding automated abnormality detection can be found in a manuscript entitled "Brain Abnormality Detection via Robust Subject-based Registration and Statistical Modeling"; the disclosure of which is incorporated herein in its entirety.

More information regarding automated abnormality detection can also be found in a manuscript entitled "Abnormality detection via iterative deformable registration and basis-pursuit decomposition"; the disclosure of which is incorporated herein in its entirety It will also be appreciated that the above described modules, components, and nodes are for illustrative purposes and that features or portions of features described herein may be performed by different and/or additional modules, components, or nodes. For example, a spatial-temporal module and/or a linear interpolation module may be separate from ADM 102. It will also be appreciated that some modules and/or components may be combined and/or integrated.

Figure 2:
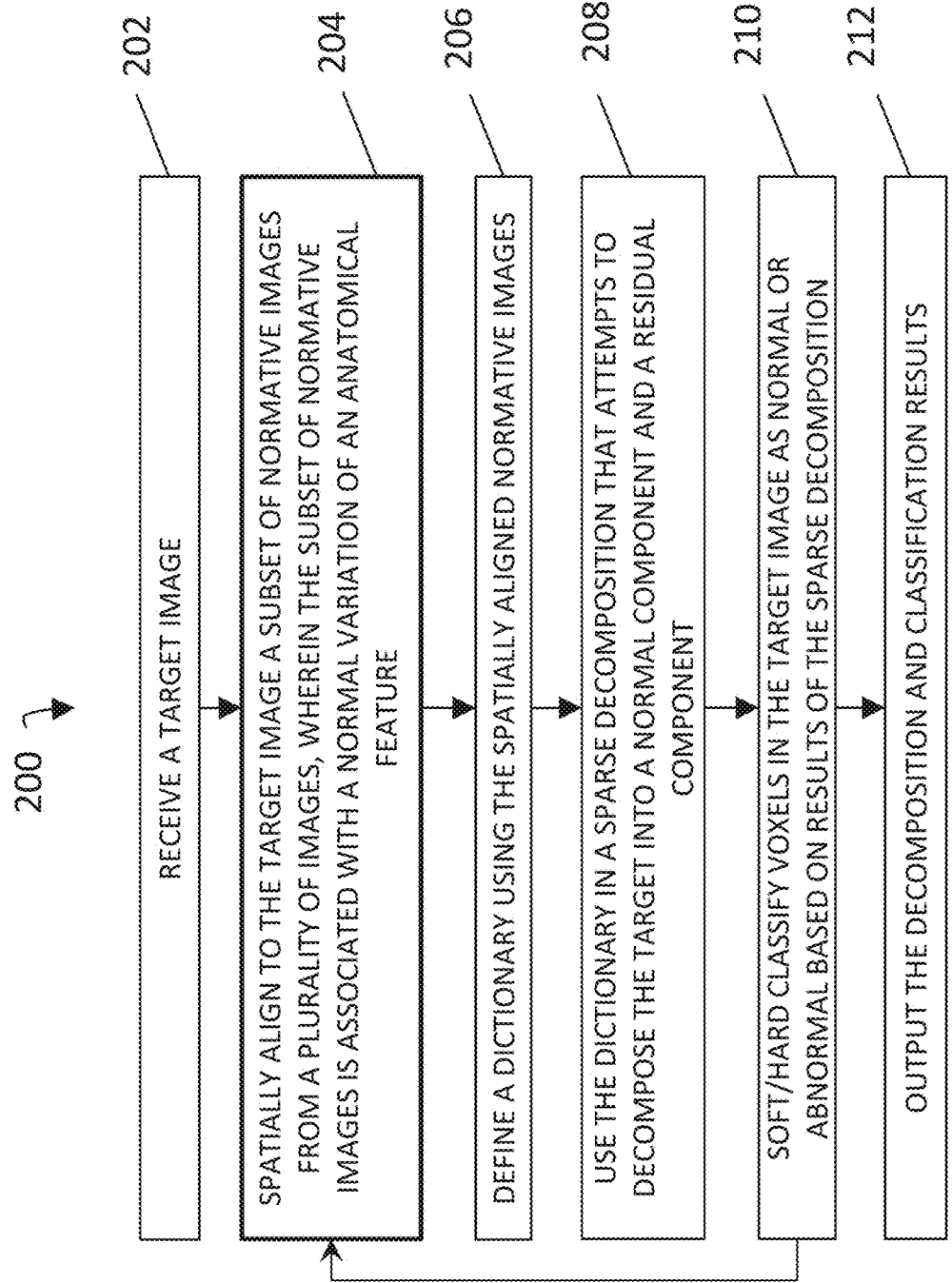
FIG. 2 is a diagram illustrating an exemplary process for automated abnormality detection according to an embodiment of the subject matter described herein.

FIG. 2 is a diagram illustrating an exemplary process for automated abnormality detection according to an embodiment of the subject matter described herein. In some embodiments, exemplary process 200, or portions thereof, may be performed by or at computing platform 100 (e.g., a medical image analysis device or a computer), ADM 102, and/or another node or module. In some embodiments, exemplary process 200 may include steps 202, 204, 206, 208, and/or 210.

In step 202, a target image may be received. For example, the target image may be a medical image of an anatomical feature (e.g., a body part or organ).

In step 204, a normative subset of images from a plurality of images is spatially aligned to the target image, or the target image to the subset. The normative subset of images is associated with a normal variation of an anatomical feature. For example, assuming a target image is associated with a lung, the normative subset may consist of images of various healthy or normal lungs.

In step 206, a dictionary is defined using the normative subset. In some embodiments, defining a dictionary may include identifying a subset of images associated with a same or similar spatial location as the target image. For example, assuming a target image is associated with a particular area of a lung, a dictionary may be defined that includes images of that particular area of different lungs, e.g., lungs associated with different people than the lung in the target image. Such spatial identification is enabled through the registration step 204.

In step 208, sparse decomposition may be used to attempt decomposition of the target image using the dictionary. For example, ADM 102 may be configured to decompose the target image into a normal component and a residual component using the dictionary.

In some embodiments, using sparse decomposition may include performing l1-norm minimization to identify a normal component and a residual component in the target image.

In step 210, each voxel of the target image will be given an abnormality score and/or classified as normal or abnormal based on results of the sparse decomposition. The abnormality score and/or the classification results may be the final output, or may be fed back to the spatial alignment step. In the latter case, ADM 102 may be configured to use the classification results from step 210 to guide the registration (step 204), forming an iterative registration-detection procedure for generating an abnormality map at each of a plurality of successively higher (e.g., finer) resolution levels. In this example, each abnormality map may or may not indicate an abnormality in a related target image.

In step 212, decomposition and classification results may be outputted. For example, after one or more iterations to better align normative images for discerning abnormalities, ADM 102 may provide operator 104 with an abnormality score and/or classification results for various portions of a target image (e.g., a medical image).

In some embodiments, ADM 102 and/or another entity may be configured to generate at least one abnormality score associated with at least one voxel of a target image based on a sliding windowing scheme with overlapping patches.

In some embodiments, ADM 102 and/or another entity may be configured to generate an image-based abnormality map after each of a plurality of successively higher (e.g., finer) resolution levels.

In some embodiments, a plurality of images (e.g., usable to define a dictionary) may include a 2D image, an x-ray, a tomogram, an ultrasound image, a thermal image, an echocardiogram, an MRI, a 3D image, a CT image, a photoacoustic image, an elastography image, a tactile image, a PET image, and/or SPECT image.

In some embodiments, a plurality of images (e.g., usable to define a dictionary) may include normal anatomical or functional variations for one or more portions of a biological system.

In some embodiments, a biological system (e.g., associated with a dictionary) may include an anatomical feature, a skeletal system, a muscular system, an integumentary system, a nervous system, a cardiovascular system, an endocrine system, a respiratory system, a urinary system, an excretory system, a reproductive system, a digestive system, a lymphatic system, a brain, a stomach, a heart, a lung, a bladder, a liver, a kidney, skin, an eye, a bone, an organ, or a body part.

Additional information associated with automated abnormality detection is discussed below and can be found in a manuscript entitled "Brain Abnormality Detection via Robust Subject-based Registration and Statistical Modeling"; the disclosure of which is incorporated herein in its entirety

1 Introduction

The task of detecting pathological regions plays a central role in medical image analysis, especially in brain imaging. As manual delineation of the pathological regions is time-consuming and suffers from large intra- and inter-rater variability, extensive efforts have been devoted to the development of fully automatic methods that could reduce both processing time and rater variability. The ultimate goal is to obtain a reproducible algorithm that could automatically process hundreds or thousands of images in research studies and clinical trials.

The literature on pathological region detection is abundant, therefore, a comprehensive summary is beyond the scope of this introduction. For multiple sclerosis (MS) brain lesions alone, a recent survey [12] listed 80 papers that describe automatic segmentation procedures. These methods focus exclusively on the delineation of MS lesions, thus relying heavily on MS lesion-specific characteristics, the most distinct of which is that MS lesions appear brighter than normal white matter on T2-weighted Magnetic Resonance (MR), Proton Density (PD) and Fluid Attenuation Inversion Recovery (FLAIR) images [12]. Although a wide range of techniques have been applied to this particular detection task where informative prior knowledge is available, the authors of [12] still conclude that "a robust, accurate, fully-automated lesion segmentation method suitable for use in clinical trials is still not available".

The discussion on MS lesion detection serves as an illustrative example of the challenges and uncertainties associated with abnormality detection, even when well-tuned methods are applied to a pathology with distinct features. In reality, however, there are hundreds of pathologies causing imaging abnormalities with diverse characteristics in different imaging modalities. For example, in stroke lesions, a hemorrhage appears as a bright region and ischemic stroke appears as a dark region in Computed Tomography scans [13], while in T1-weighted MR images an infarct lesion is shown with intensities similar to cerebrospinal fluid (CSF) or grey matter (GM) [28].

Researchers have devoted extensive efforts to developing tailored algorithms for a targeted pathology, where they analyze the characteristics and construct specialized models for their objective. Those algorithms can be divided into two categories: supervised and unsupervised. In supervised methods, a classification rule is inferred from a training set that consists of annotated images from patients with the targeted disease. Pathology in the test image is then identified according to the learned classification rule (e.g. [17]). Due to the potential heterogeneity of the disease, the training set and the learning method must be carefully chosen to produce accurate and reproducible results. Furthermore, the training set has to be manually segmented, a time-consuming and subjective procedure as already noted. Unsupervised methods, on the other hand, do not rely on an annotated training set and can be directly applied to a test image. The pathological regions may be modeled either as additional tissue classes, or simply as outliers (e.g. [26]). The detection relies on experts' knowledge of the imaging appearance of the targeted pathology and on how such prior knowledge is incorporated into the mathematical model.

Encoding the characteristics of a target pathology can be a challenging task under both supervised and unsupervised settings. The pathology of interest may vary greatly in shape and location, while its intensity profile may be indistinguishable from the intensity profile of a normal tissue type. In cases where such difficulties can be addressed by appropriate modeling, the resulting algorithms often lack the ability to extend to new domains. A framework that has encoded features dedicated to one type of pathology is difficult to generalize across other abnormalities with different characteristics. This lack of generalization ability suggests a need for separate detectors for each of the existing pathologies, which is a daunting task.

In this work, we take an alternate view to abnormality detection, which complements the individualized approaches, emphasizing generality over specificity. This alternative approach is built on the statistical perspective that pathological patterns follow probabilistic laws that are very distinct from the normative anatomical variation and is similar in spirit to the path taken in [21]. We therefore focus exclusively on the normative variation, with the premise that if one could capture the normative variation among the healthy population, then it would be possible to spot not just one specific pathology, but a broader class of pathologies as deviations from the normative model.

A generically formulated framework that identifies pathologies as deviations from normal variations can be useful in various clinical scenarios. For example, its outputs can serve as initial detectors, statistical priors or features that help subsequent, or concurrent specialized detectors. Moreover, as the use of imaging becomes increasingly widespread, automated screening of imaging data, by flagging scans with abnormalities that need further expert attention, can dramatically improve efficiency and throughput. Along the same lines, and for more subtle abnormalities, a tool for directing the attention of expert readers towards regions displaying relatively large deviation from normality would be quite helpful.

Relatively little attention is given to pathology detection approaches that do not target a particular abnormality, and capturing the normative variation among images from a healthy population features challenges of its own. The dimensionality of a typical brain scan is prohibitively large when compared to the typical number of available samples, which makes it impractical to accurately model the entire image directly. Moreover, spatial normalization, or co-registration, is essential for this task since locational information is highly relevant in any abnormality detection problem [12, 16]. However, pathological regions are by definition atypical parts in the patient's brain that lack correspondence with normal anatomies, and therefore the registration step may be robust to such topological changes and may be performed carefully.

In [10, 35, 36], an image is decomposed into a normal part (also referred to as the projection/normal projection) plus a residual, and abnormalities are detected as statistically significant parts of the residual. Regional modeling is employed in [10, 35, 36] to address the dimensionality challenge. In [10], image patches are randomly sampled from the brain and processed iteratively, with the local model built from principal component analysis in the wavelet domain. However, the decomposition is not robust enough; many of the pathological patterns are falsely absorbed into the normal part, since often the underlying anatomy does not follow a Gaussian distribution. In [35], an image is treated as a collection of minimally overlapping local patches, and consensus is enforced among overlapping parts. The final projection is cleaner from pathologies but looks overly smooth, suffering from significant loss of high frequency information. Further, in [10, 35, 36], the registration step is performed straightforwardly, completely neglecting the presence of the pathological region, a problematic procedure known to produce false deformation fields [2, 4].

Deformable registration between a normal template image and a patient image with pathologies and topological changes is, by itself, an active research area. A widely used method to isolate the impact of the abnormal region is Cost Function Masking (CFM) [4], where the pathological regions are excluded during the optimization. However, applying CFM requires a binary mask of the abnormal region which is not known a priori in our case. In some cases, such as tumors, registration can be combined with a dedicated model, which describes the growth of the pathology (see for example [15, 18, 30]), into a unified framework. Such an approach is by nature restricted to one specific pathology, and thus does not fit into a generic framework. More sophisticated generic approaches, that account for topological changes, have also been developed, for example in [20, 25, 31]. In the theory of metamorphosis [31], a Riemannian metric is defined on the image manifold, accounting for both geometric deformation and intensity changes. A geodesic path may be computed between two images, yielding a geometric diffeomorphism between the source and the target that is optimal up to some residual intensity error. However, the intensity part of the Riemannian metric is assumed to be spatially homogeneous, a property not well suited for more locally supported pathologies. Further, it is not clear how to balance the geometric deformation and intensity change in the Riemannian metric. In [20], images are embedded as surfaces in $R^4$ Riemannian space, and registration is performed as a surface revolution that matches one embedded image to another, again accounting for both shape and intensity changes necessary to match them. As in CFM, an a priori estimate of the pathological regions is required in order to attain a robust deformation field. In [25], an expectation maximization (EM) type algorithm is used to perform registration with missing data, where one alternates between segmenting missing data and estimating the deformation field. As [25] focuses on handling corrupted data with drastically different image appearances, the detection step is built on simple uni-variate statistics, which could have difficulty recognizing multivariate patterns.

Towards addressing both abnormality detection and registration, we follow our previous work [36] and treat a 3-D image as a collection of overlapping local regions that are mutually constrained. We propose a multi-domain learning framework, where we use a standard template domain for learning shape-based information while centering the intensity-based learning around the patient's image domain by warping normal training samples to it.

The proposed framework differs from [10, 35, 36], where the learning is performed only on a template domain, an approach that we experimentally found to induce template bias. The patient-specific warping approach is customary in multi-atlas segmentation method (e.g. [1, 32]) and has the advantage that the pathological regions will be kept intact during the spatial normalization. Each local patch y is written as the superposition of $D_1\alpha^*_1$ and $D_2\alpha^*_2$ by solving for the minimal $l_1$-norm solution of an under-determined linear system. Here, $D_1$ is a location-specific dictionary that accounts for normative anatomical variation, and $D_2$ is a generic dictionary that accounts for the unknown pathological patterns. The decomposition of y naturally reads $y=D_1\alpha^*_1+D_2\alpha^*_2$, with $D_1\alpha^*_1$ being the normal projection and $D_2\alpha^*_2$ being the residual. Ultimately, all partially overlapping local patches are processed jointly in a consistent way by introducing appropriate linking terms to the local decomposition. An iterative registration and detection scheme is proposed to achieve robust registration and accurate detection simultaneously. At each iteration, the robustness and accuracy of the registration improve by leveraging the detection results, either through CFM or image inpainting. The updated registration output in turn leads to refined abnormality detection.

2 Method

Figure 3:
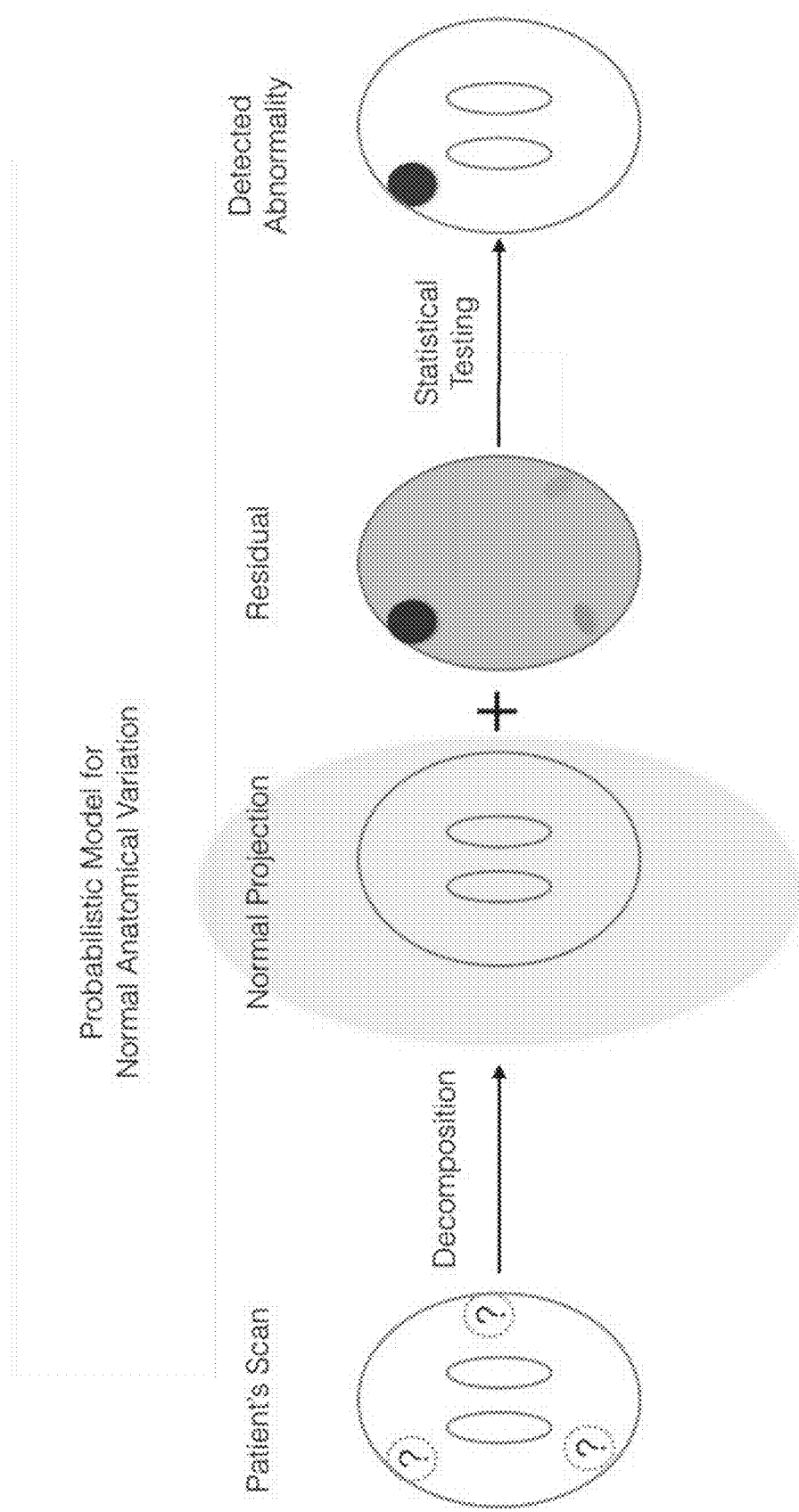
FIG. 3 is a diagram illustrating a conceptual depiction of an abnormality detection scheme according to an embodiment of the subject matter described herein.

FIG. 3 is a diagram illustrating a conceptual depiction of an abnormality detection scheme according to an embodiment of the subject matter described herein. As depicted, FIG. 3 includes a test image "projected" to a "subspace" representing normative anatomical variations within healthy subjects (the gray region). Abnormalities are identified as statistically significant parts of the projection residual.

2.1 Model for Normal Test Sample

Let N be the number of training samples, $\{\mathcal{I}_1, \mathcal{I}_2, \ldots, \mathcal{I}_N\}$ be the set of normative training images, $(i, j, k)$ be a fixed location in the 3-D image grid, and $\{y_1, y_2, \ldots, y_N\}$ be the collection of vectorized 3-D training blocks of size $p_x \times p_y \times p_z$ centered at $(i, j, k)$. Given a normal vectorized test block $y \in R^p$, $p = p_x p_y p_z$, extracted from the same spatial location, we assume that y may be approximated by a parsimonious linear combination of training samples, where parsimony is measured through the $l_1$-norm. In other words, if we let $A = [y_1, y_2, \ldots, y_N]$, then $$y \approx Ax = \Sigma_{n=1}^{N} x_n y_n \quad (1)$$

for some $x = [x_1, x_2, \ldots, x_n]^T \in R^N$ with $\|x\|_1$ small. The example-based dictionary A is effective in the sense that every training example could be represented by just one atom. Furthermore, the resulting highly correlated columns in A provide an additional structure that is useful for our purpose, as detailed below.

2.2 Model for the Pathologies Frame the setting as in the previous subsection, we now assume that the test patch $y \in R^p$ contains abnormalities, in which case (1) no longer holds. Instead, we assume that the abnormal patch y can be decomposed as the superposition of a normal part $\tilde{y}$ and an abnormal part r. Together with (1), we may write $$y = \tilde{y} + r \approx Ax + r \quad (2)$$

with a coefficient vector x that has small $l_1$ energy. The only requirement we impose on the abnormal part r is that the number of non-trivial elements in r, or the number of elements that significantly differ from zero, is strictly smaller than the dimension p. This hypothesis will hold in a wide range of cases, as long as the block size is sufficiently large and the abnormalities are focal in space.

The columns in the dictionary A are highly correlated with each other since they are image blocks drawn from the same spatial location. With this additional structure, it has been both empirically and theoretically verified that, after normalizing the columns in A to unit $l_2$-length, Ax and r can be recovered via the following $l_1$-norm problem $$(P1) \min \|x\|_1 + \|r\|_1 \text{ subject to } Ax + r = y, \quad (3)$$

even when the abnormal part r is not sparse [33, 34]. Interested readers are referred to the "cross-and-bouquet" model discussed in [33, 34] for more technical insights.

Note that (P1) could also be written as $$(P1\text{-}BP) \min \|\alpha\|_1 \text{ subject to } D\alpha = y \quad (4)$$

with $\alpha = [x; r]$ and $D = [A, I]$, which is a classical procedure known as the basis pursuit [5]. Here A is our choice of the location-specific dictionary that accounts for normative anatomical variation, and the identity matrix I is used as the generic dictionary that accounts for the unknown pathological patterns, though I may be replaced by more specific dictionaries that can better represent a target pathology. By seeking the minimal $l_1$-norm solution to the under-determined linear system $D\alpha = y$, we achieve a natural decomposition of y into the normal part and the residual.

2.3 Geometric and Probabilistic Interpretation

In this section, we present geometric and probabilistic interpretations for the optimization problem (P1).

Under the additional assumption that (P1) admits a unique solution (see [37] for a necessary and sufficient condition), we may rewrite it in the following two constrained forms, $$\min \|y - Ax\|_1 \text{ subject to } \|x\|_1 = \|x^*\|_1$$

or $$\min \|y - Ax\|_1 \text{ subject to } \|x\|_1 \leq \|x^*\|_1,$$

where $x^*$ is the unique optimal solution for (P1). The constrained forms suggest that 1) we are approximating the manifold on which y resides with the facets of a polytope, that is $\{z = Ax: \|x\|_1 = \|x^*\|_1\}$, and 2) we are searching for the point closest to y in terms of $p_1$-norm within the polytope $\{z = Ax: \|x\|_1 \leq \|x^*\|_1\}$, justifying the terminology "normal projection".

From a stochastic point of view, we are modeling y under the Bayesian linear regression framework, or $y = Ax + r$, with a Laplacian prior $p(x) \propto \exp(-\|x\|_1)$ and a Laplacian likelihood $p(r) \propto \exp(-\|r\|_1)$. It is clear that $x^*$ corresponds to the maximum a posteriori (MAP) estimate for x.

2.4 Joint Projection for all Local Blocks

One may envision the block-level decomposition process discussed in Sec. 2.2 as a local system that outputs the partial estimate $\tilde{y} = Ax^*$ through (P1). Those partial results need to be fused together to obtain a global estimation. A straightforward way to reconstruct the whole image from local blocks is through simple averaging, customary in the literature [8]. However, estimating the overlapping image blocks independently is a sub-optimal approach, as pointed out in [27].

To address the foregoing issue, a distributed estimation algorithm is proposed in [27] and adopted in [35] for abnormality detection on 2-D image slices, where consensus between minimally overlapped subsystems is enforced through hard constraints. However, in our case the estimation task can not be easily "distributed", as we work on image blocks with significant overlaps from a large 3-D image, rendering the method in [27] unsuitable for our purpose. Instead, we add extra penalty terms, which link the individual blocks, to the objective function, an alternative approach to achieve the goal of consistency that is equivalent to hard constraints in the limit.

We now present the full formulation of the joint optimization problem. Let $\mathcal{S}$ be the index set for the location of the blocks within the image $\mathcal{I}$, $A_S$ be the example-based dictionary for location $s \in \mathcal{S}$, and $y_s$ be the test block centered around this location. The proposed optimization problem may be written as $$\min_{x_s, s \in \mathcal{S}} \Sigma_{s \in \mathcal{S}} (\|x_s\|_1 + \|y_s - A_s x_s\|_1) + \frac{w}{2} \Sigma_{s_1, s_2 \in \mathcal{I}, s_1 \neq s_2} \Gamma(s_1, s_2), \quad (P2)$$

where the $\Gamma(s_1, s_2)$'s are the penalty terms that enforce consistency across partially overlapping patches. Specifically, $$\Gamma(s_1, s_2) = \begin{cases} 0 & \text{if } y_{s_1} \cap y_{s_2} = \emptyset \\ \| P_{s_1}^{s_2} A_{s_1} x_{s_1} - P_{s_2}^{s_1} A_{s_2} x_{s_2} \|_2^2 & \text{otherwise,} \end{cases}$$

where $P_{s_1}^{s_2}$ ($P_{s_2}^{s_1}$) is the operator that extracts from $y_{s_1}$ ($y_{s_2}$) the overlap with $y_{s_2}$ ($y_{s_1}$), respectively. Note that sending the weight parameter w to infinity is equivalent to requiring $P_{s_1}^{s_2} A_{s_1} x_{s_1} = P_{s_2}^{s_1} A_{s_2} x_{s_2}$.

From a different perspective, we are effectively modeling $\{y_s\}_{s \in S}$ with a Markov random field in the exponential family, where the nodes are $\{x_s\}_{s \in S}$ and $\{y_s\}_{s \in S}$. The graph structure reads 1) $x_s$ and $y_s$ are connected for all $s \in S$, and 2) $y_{s_1}$ and $y_{s_2}$ are connected if and only if they overlap. The joint likelihood for $\{\{x_s\}_{s \in S}, \mathcal{I}\}$ admits the form $$p(\{x_s\}_{s \in S}, \{y_s\}_{s \in S}) \propto \exp\left\{-\Sigma_{s \in S}(\|x_s\|_1 + \|y_s - A_s x_s\|_1) - \frac{w}{2} \Sigma_{s_1, s_2 \in \mathcal{T}, s_1 \neq s_2} \Gamma(s_1, s_2)\right\},$$

from which it is clear that (P2) solves for precisely the MAP estimate of $\{x_s\}_{s \in S}$.

The individual blocks now "speak" to one another through the $\Gamma(s_1, s_2)$ terms, but without complicating much the inference task. Indeed, though non-separable in the $x_s$, (P2) is still convex and may be solved efficiently in a Gauss-Seidel fashion. If we assume that the index set $S$ is ordered, the updating rule may be stated as $$x_s^{(k+1)} := \arg \quad (5)$$

$$\min_{x_s} \left( \|x_s\|_1 + \|y_s - A_s x_s\|_1 + \sum_{r<s, y_r \cap y_s \neq \emptyset} \frac{w}{2} \|P_s^r A_s x_s - P_r^s A_r x_r^{(k+1)}\|_2^2 + \Sigma_{u>s, y_u \cap y_s \neq \emptyset} \frac{w}{2} \|P_s^u A_s x_s - P_u^s A_u x_u^{(k)}\|_2^2 \right).$$

In our implementation, each Gauss-Seidel update is solved using the Alternating Direction Method of Multipliers [3]. Let $\{x^*_s, s \in S\}$ be the optimal solution of (P2), the projection $\tilde{\mathcal{I}}$ of $\mathcal{I}$ is reconstructed from $\{\tilde{y}_s := A_s x^*_s, s \in S\}$ through average pooling. Specifically, for each voxel v, we denote by $\{y_v^1, y_v^2, \ldots, y_v^M\}$ the blocks in which v is contained. The final value at v is set as the average of $\{y_v^1(v), y_v^2(v), \ldots, y_v^M(v)\}$.

2.5 Block Size Selection

The size of the local blocks determines the scale at which we study the image content. Therefore, it is one of the most influential, if not the most crucial parameter in the proposed model. On one hand, the representation ability of the model decreases with increasing block size. In particular, if we extract tiny image blocks, we would be able to capture fine details of the image, thus expect a faithful reconstruction $\tilde{\mathcal{I}}$ when $\mathcal{I}$ is a normal image; whereas, in the other extreme, when we consider the entire image as a single block, one would expect to lose significant detailed information. In the quantitative results presented in Sec. 3.2, we will verify that smaller block size does lead to lower projection error when $\mathcal{I}$ is normal.

However, the ability to represent normative anatomical variation is not the only factor that demands consideration. An overly localized model might fail to recognize abnormal patterns as outliers. The abnormal regions may be well represented by a normal dictionary when the block size is inadequate, as the dictionary lacks the ability to capture more global patterns. In particular, it has been demonstrated in [34] (see FIG. 12 in [34] for example) that (P1) starts to break down when approximately 40% of y is corrupted. In our case, this implies that abnormalities have a much higher chance of being represented by Ax than by r when the fraction of abnormalities in a block exceeds 40%.

Figure 4:
FIG. 4 is a diagram illustrating examples showing the effect of block size on decomposition results.

The effect of block size on robustness of the model is best illustrated with a concrete example. FIG. 4 is a diagram illustrating examples showing the effect of block size on the decomposition results. FIG. 4 shows a patient's image with lesions. The red box in the left panel of FIG. 4 is a uniform area of bright lesions, and the corresponding box from a normative image is most likely a uniform area of normal-appearing white matter. Those two uniform areas are indistinguishable after being normalized to have unit $l_2$-norm, therefore, the lesion block will be reconstructed perfectly through (P1). This will not be the case at the scale of the green block in the central panel, where the contrast between the lesions and surrounding normative tissues is preserved and the lesion fraction does not exceed 40%. The lesions will most likely be correctly absorbed into the residual term r, as suggested by the theoretical results in [33, 34].

It is clear from the foregoing discussion that one must carefully balance between model accuracy and robustness when deciding the block size, to which the correctness of (P1) is highly sensitive. Fortunately, treating the blocks jointly through (P2) turns out to be helpful in alleviating the situation. One instance where jointly processing all blocks is beneficial is shown in the right panel of FIG. 4. In this case, (P1) will correctly decompose the four green blocks, and the consistency penalties will "pull" the decomposition of the red block towards the correct direction.

It is also clear that much may be gained by selecting the block size adaptively, provided that the location of the abnormalities is given. Although we do not have the precise location, an estimation from the previous round is available in the proposed iterative framework, and it can be utilized for block size selection in future iterations. In the numerical experiment the default block size is set to ensure that image content is viewed at an intermediate scale. The block size is adaptively increased around the (estimated) abnormal region.

2.6 Generation of the Abnormality Score

We now describe how to transform the decomposition results to a statistical abnormality map. Let $\mathcal{D}$ be a measure that quantifies the difference between two given images at each voxel. Considering that the brain contains highly variable, complex structure such as the cortex, we expect that the proposed model is not able to fully capture normal variations within healthy subjects, resulting in a non-trivial $\mathcal{D}(\mathcal{I}, \tilde{\mathcal{I}})$ even when $\mathcal{I}$ is considered normal. Therefore, it is important to standardize the difference $\mathcal{D}(\mathcal{I}, \tilde{\mathcal{I}})$ through permutation tests, rather than use it directly, as we quantify the abnormality level of each voxel. More precisely, for every normal image $\mathcal{I}_n$ in $\{\mathcal{I}_1, \mathcal{I}_2, \ldots, \mathcal{I}_N\}$ we compute its normal projection $\tilde{\mathcal{I}}_n$ using the remaining subjects $\{\mathcal{I}_1, \ldots, \mathcal{I}_{n-1}, \mathcal{I}_{n+1}, \ldots, \mathcal{I}_N\}$ as training samples. This step defines a null distribution for the difference between $\mathcal{I}_n$ and $\tilde{\mathcal{I}}_n$, based on which statistical tests may be performed for any test pair $(\mathcal{I}, \tilde{\mathcal{I}})$.

The difference measure may be simply set as the voxel-wise intensity difference, though some prior knowledge of the abnormality pattern would be helpful when making decisions for $\mathcal{D}$. Loosely speaking, an ideal $\mathcal{D}$ would emphasize the abnormal regions in $\mathcal{D}(\mathcal{I}, \tilde{\mathcal{I}})$. In the numerical implementations, we have experimented solely with the voxel-wise intensity difference, and the Crawford-Howell t-test [7] is employed to test $\mathcal{D}(\mathcal{I}, \tilde{\mathcal{I}})$ against $\{\mathcal{D}(\mathcal{I}_1, \tilde{\mathcal{I}}_1), \ldots, \mathcal{D}(\mathcal{I}_N, \tilde{\mathcal{I}}_N)\}$. The resulting test score is used to quantify the abnormality level for each voxel. The abnormality score may also be thresholded to create a binary mask.

2.7 Abnormality Detection for Generic Functions

With minor modifications, the proposed abnormality detection framework can be applied to generic functions defined on an image grid. All the model ingredients remain valid given a suitable choice of the location-specific dictionary $A_s$. As the location-specific training samples are not necessarily highly correlated with each other for generic functions, we do not expect an unobserved sample to be reconstructed as a sparse combination of raw training samples. A general class of alternatives includes the output of matrix decomposition algorithms that aim to extract underlying basic elements (atoms) from raw observations. Principal component analysis, non-negative matrix factorization [19, 24, 29] and dictionary learning methods [9] are all instances of such algorithms. Furthermore, as we lose the robustness provided by the "cross-and-bouquet" structure, it may become necessary to constrain the $l_1$-norm of the coefficient x to prevent over-fitting.

In this paper, we employ the following constrained version of (P2) when decomposing generic functions on the image grid. One example for such generic functions that could benefit the proposed method is the log Jacobian determinant of a deformation field, which captures shape-based abnormalities that are not reflected in the intensity domain. The constrained version (P2-C) has the form $$\min_{x_s, s \in S} \Sigma_{s \in S} \left( \|x_s\|_1 + \|y_s - A_s x_s\|_1 \right) + \quad \text{(P2-C)}$$

$$\frac{w}{2} \Sigma_{s_1, s_2 \in \mathcal{I}, s_1 \neq s_2} \Gamma(s_1 s_2) \text{ s.t. } \|x_s\|_1 \leq u_s, \forall s \in S.$$

We fix the location-specific dictionary $A_s$ to be the top eigenvectors of the sample covariance matrix that explain 95 percent of the total variance. We empirically set a location-specific upper bound $u_s$ for the $l_1$-norm of x. Specifically, we first run the unconstrained version (P2) within the normative database. Each normal logJacDet $\mathcal{I}_n$ is decomposed using the remaining samples. We record the $l_1$-norm $\rho_s^n$ of the optimal solution $x_s^n$ at location s. The location-specific upper bound $u_s$ is then determined by the 80th percentile of $\{\rho_s^1, \rho_s^2, \ldots, \rho_s^N\}$.

2.8 Iterative Registration-Detection Procedure

We now address two assumptions that we have made implicitly so far: 1) all images have been non-linearly aligned to an unspecified coordinate system, and 2) such a registration step can be robust in the presence of abnormalities, i.e., the registration may accurately align the normal regions, while relaxing the deformation around the abnormalities instead of aggressively matching normal regions to abnormal ones (or vice versa).

Regarding the first assumption, there are two competing needs to be met. On the one hand, as mentioned in the previous section, including shape information is useful as it provides complementary information to image intensities. However, shape information can only be captured in a fixed reference space by warping both training samples and the "query" image to this reference. On the other hand, we aim to detect abnormalities in the patient's brain, a task that can be best accomplished in the patient's native space.

Regarding the second assumption, the registration step is a challenging task by itself. Regions of the patient's brain are affected by the disease and the topological property of these regions has been altered. Such topological changes will impact the registration, resulting in heavily distorted training samples, which may in turn compromise the detection task.

To tackle the aforementioned difficulties, we propose an iterative scheme that incorporates both template domain and subject domain learning, while interleaving registration with abnormality detection. The iterative scheme needs to be carefully initialized as an insufficient initial detection will misguide the subsequent registration, which in turn will lead to inaccurate detection. We propose to initialize by learning in a fixed reference space so that we can take into account both intensity-based and shape-based information. This fixed reference space is constructed as an unbiased template $\mathcal{T}$ that is representative of the training set [11]. The training samples $\mathcal{I}_1, \ldots, \mathcal{I}_N$ are then non-linearly registered to the template $\mathcal{T}$. We record the log Jacobian determinant of the corresponding deformation fields as $\mathcal{I}_1, \ldots, \mathcal{I}_N$. We also denote by $\mathcal{I}_1^T, \ldots, \mathcal{I}_N^T$ the warped images. The subject image J is also warped to $\mathcal{T}$, giving a corresponding diffeomorphic deformation field $\Phi$, log Jacobian determinant $\mathcal{I}$ and warped image $\mathcal{I}^T$. Let $\mathcal{MS}$ $\text{MS}_0$ (S for shape) be the abnormality score for $\mathcal{I}$ with respect to the training population $\mathcal{I}_1, \mathcal{I}_2, \ldots, \mathcal{I}_N$, and let $\mathcal{MI}_0$ (I for intensity) be the abnormality score for $\mathcal{I}^T$ with respect to the training population $\mathcal{I}_1^T, \mathcal{I}_2^T, \ldots, \mathcal{I}_N^T$, then the initial abnormality map $\mathcal{AM}_0$ is set as $$\mathcal{AM}_0 = \max(|\mathcal{MS}_0|, |\mathcal{MI}_0|) \cdot \Phi^{-1}.$$

Here $\Phi^{-1}$ is well defined as we have ensured that $\Phi$ is a diffeomorphism by limiting the maximum allowed displacement in each DRAMMS iteration [6] and combining the per-iteration deformation fields through composition. Lastly, the max operator is used to combine $\mathcal{MS}_0$ and $\mathcal{MI}_0$ based on the premise that an abnormality is detectable in either $\mathcal{MS}_0$, if it has been aggressively matched to a normal region by $\Phi$, or in $\mathcal{MI}_0$, if it has been preserved by a smoother deformation field.

Based $\mathcal{AM}_0$ and its thresholded binary version $\mathcal{BM}_0$, we refine the registration, the decomposition (P2) and after that the detection result during each subsequent iteration. Within each iteration, robust patient-specific registration is performed by leveraging the current estimate of the pathological regions. Using the updated registration results, an intensity-based abnormality map $\mathcal{MI}_{k+1}$ is then generated through the decomposition (P2) and subsequent significance test. The update rule for $\mathcal{AM}$ reads $\mathcal{AM}_{k+1} = \max\{|\mathcal{MI}_{k+1}|, \mathcal{AM}_0\}$, after which $\mathcal{BM}_{k+1}$ is updated as $\mathcal{BM}_{k+1} := H_t(\mathcal{AM}_{k+1})$. Here max represents the voxel-wise max operator and $H_t$ represents the hard thresholding operator with threshold t, that is, $$H_t(x) = \begin{cases} 0 & \text{if } |x| \leq t, \\ 1 & \text{if } |x| > t. \end{cases}$$

The procedure is summarized in Algorithm 1 where all the operators are overloaded in a voxel-wise fashion.

The registration part and step 4 in the detection part merit further explanation. Through (6) we form a new image $J^k$ by inpainting the original image $J$ with its current normal projection $\tilde{J}^k$. In particular, $J^k$ takes the value of $J$ in the estimated normal regions ($\mathcal{BM}_k=0$) and the value of $\tilde{J}^k$ in the estimated abnormal regions ($\mathcal{BM}_k=1$). Therefore, $J^k$ is an estimate of what a patient's brain looks like before the development of the pathologies, and a substitute for $J$ as the reference image in the subsequent registration. This procedure is adopted in Algorithm 1, except for the first iteration where $J^0$ is not available and one instead resorts to CFM.

The max operator that is used to combine $|\mathcal{MJ}_k|$ and $\mathcal{AM}_0$ also demands some clarification. The initial abnormality scores capture shape-based abnormalities that can not be revealed by the future intensity-based abnormality maps. Therefore, merging the initial abnormality scores with $\mathcal{MJ}_k$ at each subsequent iteration allows the transfer of important information regarding pertaining shape abnormalities. It could be possible that along with this useful information, falsely identified abnormalities propagate along iterations. However, we have empirically found that the initial abnormality scores tend to under-segment the lesions rather than giving artificially high abnormality scores to normal regions. This behavior is demonstrated in FIG. 8 in the experiments section.

3.1 Database: Brain Lesions

The normative training set (NC) consists of MRI scans from 72 healthy subjects, with voxel size 0.93 mm×0.93 mm×1.5 mm. All scans are manually inspected to ensure they do not include any visible pathologies, beyond those common within the subjects' age range (e.g. peri-ventricular hyper-intensities). The first test set (TestSet1), involves images from 14 subjects with brain lesions, with manual masks of the lesion created by a radiologist. The second test set (TestSet2), involves images from 20 subjects from an aging population with high prevalence of abnormalities. On TestSet2, manual masks for white matter lesions and infarcts have been created by one expert. The average age of the training subjects is 59.3 with a standard deviation of 4. The mean (±standard deviation) age is 60.8±5.8 for TestSet1 and 75±4.7 for TestSet2. We mainly use FLAIR images for validation, but a multi-modality extension is straightforward and will be discussed in Section 4.

3.2 Performance on Normative Images

In the first experiment we examine the performance of the model on capturing normative brain variation. 20 subjects are randomly selected from NC and treated as a test subject in a leave-one-out fashion. For each left out subject, we register the remaining samples to it using a moderate regularization parameter (g=0.3) for DRAMMS. We do not follow the iterative scheme, as pathological regions are absent in the test image. The focus here is to quantify the distance between $\tilde{J}$ and $J$ for a normal $J$, given good spatial normalization.

---

Algorithm 1 Iterative registration and abnormality detection procedure

---

Input: $\{J_1,...,J_N\}$, $J$, distance measure $\mathcal{D}$, initial abnormality map $\mathcal{AM}_0$ and binary mask $\mathcal{BM}_0$, total number of iterations K, DRAMMS regularization weights $\{g_1,...,g_K\}$, thresholds $\{t_1,...,t_K\}$
Output: Projection $\tilde{J}^k$ and abnormality map $\mathcal{AM}$ for J
    initialization
    for k = 1 to K do
        Registration Part:
        if k = 1 then
            Register $\{J_1,...,J_N\}$ to $J$ with $g_k$, neglecting the regions within $\mathcal{BM}_{k-1}$ using CFM.
        else
            Register $\{J_1,...,J_N\}$ to $J^{k-1}$ with $g_k$
        end if
        Detection Part:
        Step 1: Decompose $J$ into $\tilde{J}^k + \mathcal{R}^k$ through (P2)
        Step 2: Compute $\mathcal{MJ}_k$ through Crawford-Howell t-test
        Step 3: Update $\mathcal{AM}_k$ as $\mathcal{AM}_k := \max\{|\mathcal{MJ}_k|, \mathcal{AM}_0\}$ and $\mathcal{BM}_k$ as $\mathcal{BM}_k := H_{t_k}(\mathcal{AM}_k)$
        Step 4: Estimate a pathology-free version $J^k$ for $J$ via
$$J^k := (1 - \mathcal{BM}_k) * J + \mathcal{BM}_k * \tilde{J}^{kk} \quad (6)$$
    end for
Output $\tilde{J}^k := \tilde{J}^{kK}$ and $\mathcal{AM} := \mathcal{AM}_K$

---

3 Numerical Experiments

In this section, we present the experimental validations of the proposed method. We first experiment on brain images from healthy subjects to examine how well normative variation can be captured by the model. We then apply the proposed abnormality detection framework on both simulated and clinical brain lesion data to analyze its performance on registration and abnormality detection. The proposed framework is also evaluated on an Alzheimer's Disease database to demonstrate the generality of the method. Unless otherwise specified, DRAMMS [22, 23] is set as the default choice for deformable registration throughout the experiment.

Ideally, $\tilde{J}$ may be exactly equal to $J$ as the latter is a normal image. In practice, however, it is unrealistic to expect a perfect $\tilde{J}$ through the numerical procedure (P2), and results may be acceptable when $\tilde{J}$ and $J$ are reasonably close. Here, the distance measure is chosen as the root-mean-square error (RMSE). We look into the effect of block size on RMSE to verify the hypothesis made in Sec. 2.5, that is, the representation ability of the model decreases with increasing block size. We evaluate the RMSE using 3 different block sizes: 7.44 mm×7.44 mm×6 mm, 14.88 mm×14.88 mm×12 mm, and 29.76 mm×29.76 mm×24 mm. The step size for the sliding windows is set as half of the block size, and the consensus weight as w=1, a value used throughout the experiments as it leads to sufficient consistency. The mean±std RMSE with the 3 incremental block sizes are 8.64±1.13, 9.70±1.19, 10.22±1.21, respectively, which confirms our foregoing hypothesis.

For a more concrete understanding about the quality of $\tilde{J}$, we also compute the RMSE between the original images and their smoothed versions. The images are smoothed with isotropic Gaussian kernels of standard deviations 1 mm, 1.5 mm and 2 mm. The mean±std RMSE for the 3 incremental bandwidths is 9.04±0.82, 10.69±1.03, and 13.61±1.17, respectively. For the selected 20 normal images, the quality of the projection $\tilde{J}$, using the medium block size, is slightly superior to that of the smoothed original image with a standard deviation 1.5 mm in terms of RMSE.

3.3 Simulated Experiment: Brain Lesions

We next evaluate the framework on simulated abnormalities. The advantages of a simulated study are threefold. Firstly, ground truth is available to evaluate the method for such data. Secondly, one may freely vary the location and size of the abnormalities and examine how these factors affect the results. Lastly, one may quantify the quality of any registration that involves simulated images as we know the normal image $J^G$ on which the abnormality is simulated. Such knowledge provides us the "ground truth" for any training sample $J_n$, which is the registration result when warping $J_n$ to $J^G$.

Figure 5:
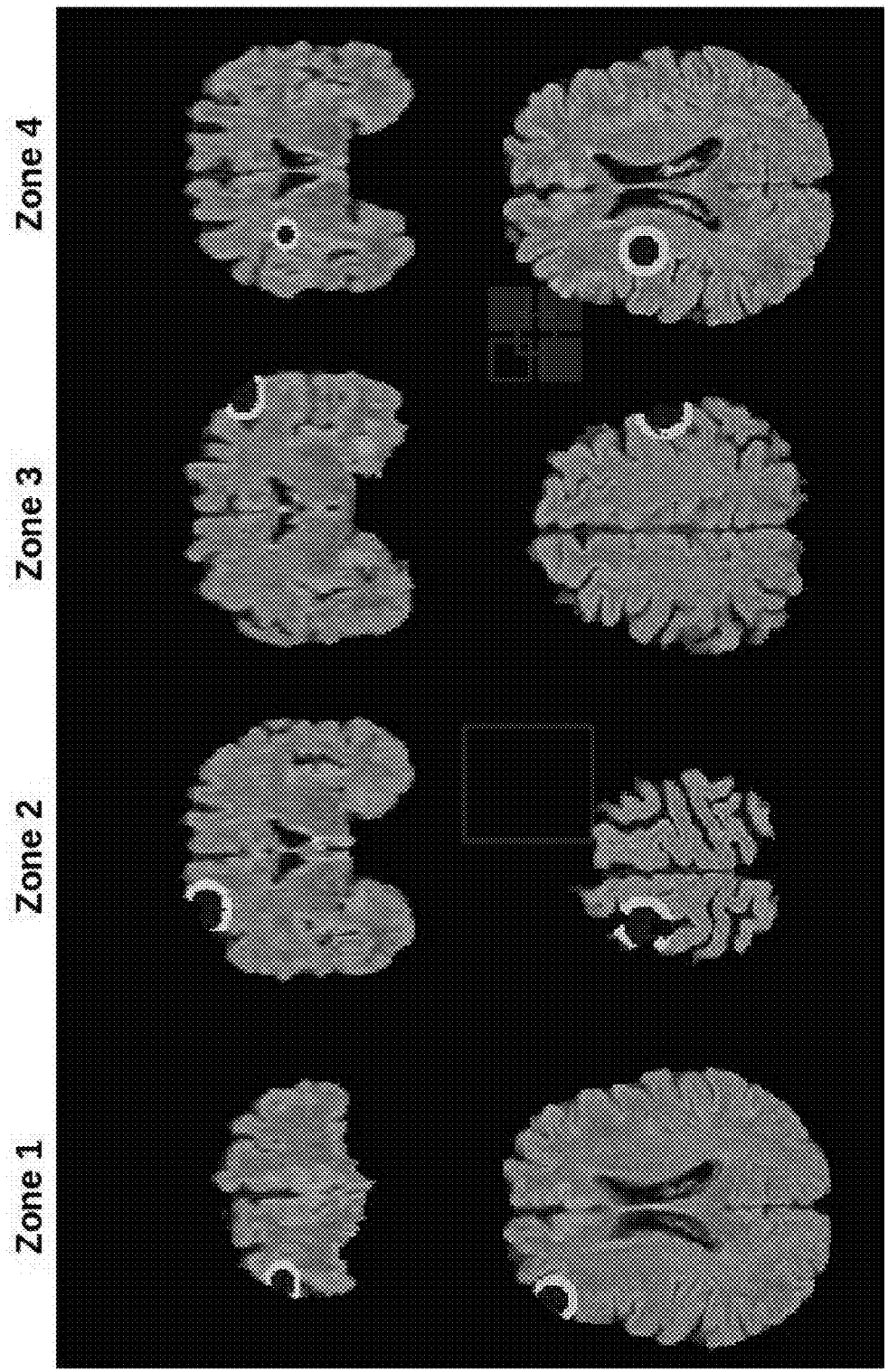
FIG. 5 is a diagram illustrating representative examples of simulated abnormal images.

The simulated abnormality is ellipsoidal in shape and it consists of a necrotic interior with surrounding bright lesions. The intensity profile of the pathological region is set according to its typical appearance on FLAIR images. More specifically, the intensity of the necrotic interior is matched to the intensity profile of the cerebrospinal fluid (CSF), while the intensity of the peripheral region is given a 60% signal increase when compared to normal white matter. While it is relatively easy to spot hyper-intense lesions, the necrotic parts are much more difficult to detect as they may share location and intensity profile with cortical CSF. We simulate lesions on 4 different anatomical locations (Zone 1, Zone 2, Zone 3 and Zone 4) with 5 progressively larger sizes on the same image. The semi-principal axes length ranges from 10 mm×10 mm×8 mm to 19 mm×19 mm×15 mm. Representative examples of simulated lesions with intermediate size are shown in FIG. 5. Note that Zone 1, Zone 2 and Zone 3 lesions are all simulated in the cortex, while Zone 4 lesions are positioned in deep white matter.

Next we explain the implementation details, starting with how the initial abnormality map is generated. Recall from Sec. 2.8 that we have constructed an unbiased template $\mathcal{T}$ for the normative set NC. The normative samples are warped to $\mathcal{T}$. The log Jacobian determinant maps (logJacDet) of the associating deformation fields are recorded as $(J_1, J_2, \ldots, J_N)$ and the warped images as $J_1^T, J_2^T, \ldots, J_N^T$. We register each simulated test image to $\mathcal{T}$ and save the corresponding logJacDet $J$ together with the warped image $J^T$.

FIG. 5 is a diagram illustrating representative examples of simulated abnormal images. Each column shows lesion region simulated at one selected location and the region is of intermediate size. Each warped image is decomposed directly with (P2) using the example-based dictionary. The intensity-based abnormality map $\mathcal{MI}_0$ is the Crawford-Howell t-statistics of $J^T - \tilde{J}^T$ against $\{J_1^T - \tilde{J}_1^T, J_2^T - \tilde{J}_2^T, \ldots, J_N^T - \tilde{J}_N^T\}$. The block size is set to 14.88 mm×14.88 mm×12 mm. We solve the modified version (P2-C) when decomposing the logjacDet $J$'s, with the block size set to 7.44 mm×7.44 mm×6 mm. The shape-based abnormality map, or $\mathcal{MS}_0$, is also calculated using the Crawford-Howell t-test. Representative examples of ($\mathcal{MS}_0$, $\mathcal{MI}_0$) pairs are shown in FIG. 5. $\mathcal{MS}_0$ better captures the necrotic part of the lesion, while the bright surroundings are more salient in $\mathcal{MI}_0$.

The initial abnormality map $\mathcal{AM}_0$ is thresholded at t=3 when producing the binary $\mathcal{BM}_0$, after which we proceed to the iterative registration-detection scheme. The specific parameter settings are detailed as follows. The total number of iterations is set to K=5. We fix the DRAMMS regularization weights to $g_k$=0.3 and the threshold values to $t_k$=4 for all k. The threshold approximately sets a significance level p<0.005 (if the values were truly normally distributed). The block size is determined in an adaptive way. The default block size is 14.88 mm×14.88 mm×12 mm, and the block size is doubled until at least 60% of the volume is classified as normal in the previous iteration. The 60% threshold is set based on the 40% breakdown point of (P1), as detailed in Sec. 2.5.

Figure 6:
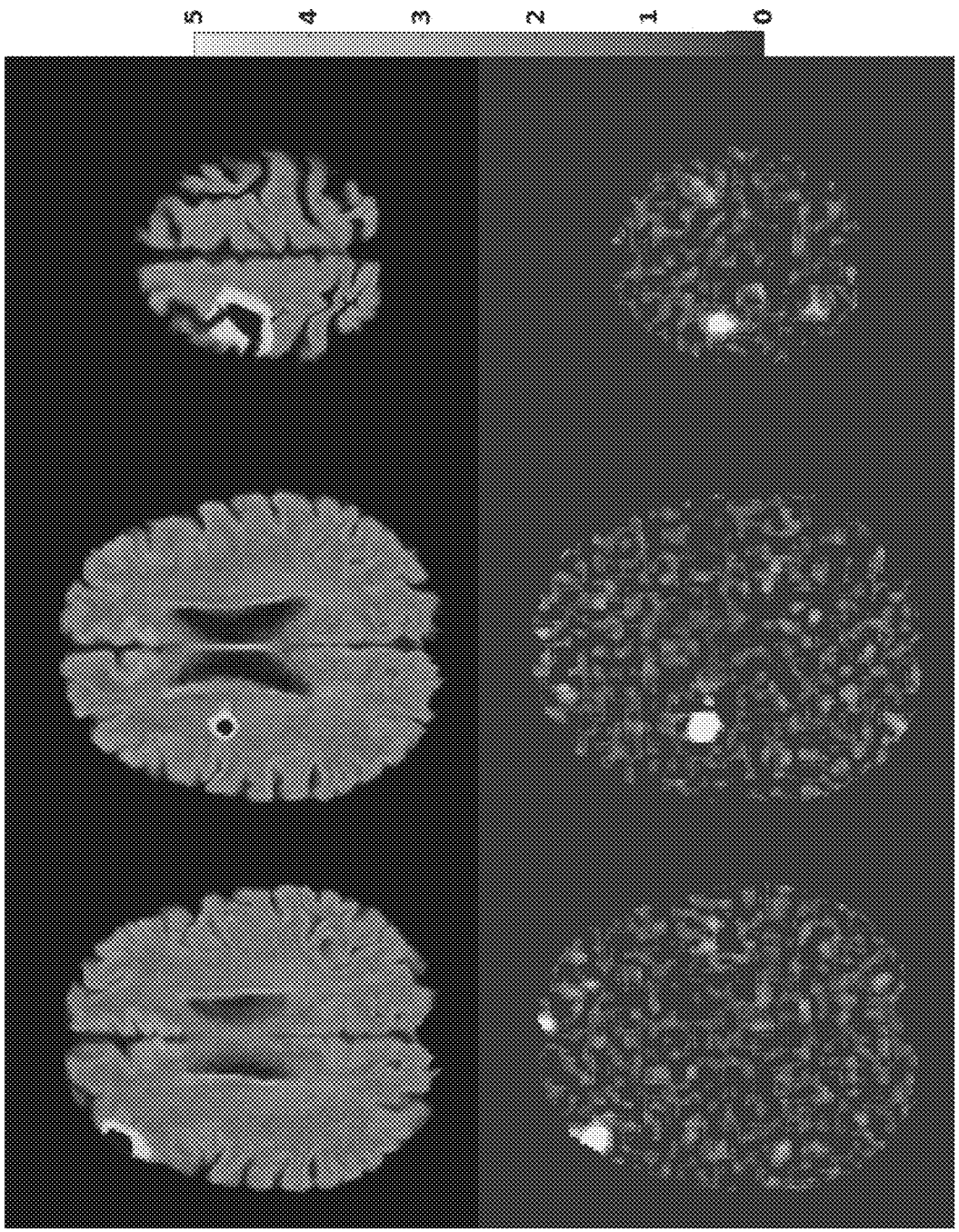
FIG. 6 is a diagram illustrating representative examples of ($\mathcal{MS}_0, \mathcal{MS}_0$) pairs.

FIG. 6 is a diagram illustrating representative examples of ($\mathcal{MS}_0$, $\mathcal{MI}_0$) pairs. The top row depicts simulated images warped to $\mathcal{T}$. The middle row depicts simulated images warped to $\mathcal{MS}_0$. The bottom row depicts simulated images warped to $\mathcal{MI}_0$.

We now demonstrate that the discriminative power and the registration accuracy of the outputs simultaneously improve along the iterations in Algorithm 1. We quantify the discriminative power of the abnormality map $\mathcal{AM}_k$ with two measures: Area Under Curve (AUC) and Hellinger Distance (HD) between the abnormality score distribution of the True Positives (TPs) and that of the True Negatives (TNs). The HD measure is defined in what follows. Let $P_0$ denote the abnormality score distribution of the TNs ($P_0$={ $\mathcal{AM}_k(v) | \mathcal{GT}(v)=0$}) and $P_1$ denote that of the TPs ($P_1$={ $\mathcal{AM}_k(v) | \mathcal{GT}(v)=1$}), where $\mathcal{GT}$ is the ground truth labelling. $P_0$ and $P_1$ are indicative of the quality of the abnormality maps, as a good abnormality map will give low values to $P_0$ and high values to $P_1$. Therefore, higher values of HD imply better separation between normal and abnormal regions in the abnormality map.

The registration accuracy at each iteration is quantified in the following manner. Let $J^G$ be the normal image on which the abnormalities are simulated. Since no manual landmarks or parcellation are available for any training sample $J_n$, the gold standard is chosen as the warped image $J_n^G$ when registering $J_n$ to $J^G$. For each simulated image $J^S$, we use $J_n^k$ to represent $J_n$ warped to $J^S$ at iteration k. The quality of $J_n^k$ is measured by the relative difference $\Gamma_n^k$ between $J_n^k$ and $J_n^G$ within the lesion mask, that is, $\Gamma_n^k = \|M(J_n^k - J_n^G)\|_2 / \|M(J_n^G)\|_2$, where M is the operator that extracts the lesion region from the image. Twenty images from NC are randomly chosen for validation. Therefore, registration accuracy at each iteration is quantified through 20×20=400 counts of relative differences. We also examine the quality of the normal projection $\tilde{J}_k$, by measuring $\Lambda_k = \|M(\tilde{J}_k - J^G)\|_2 / \|M(J^G)\|_2$, which is the relative distance to the "ground truth" $\tilde{J}^G$ within the lesion region. Smaller values of $\Lambda_k$ imply that $\tilde{J}_k$ better approximates what the patient's image looks like before pathology development.

Figure 7:
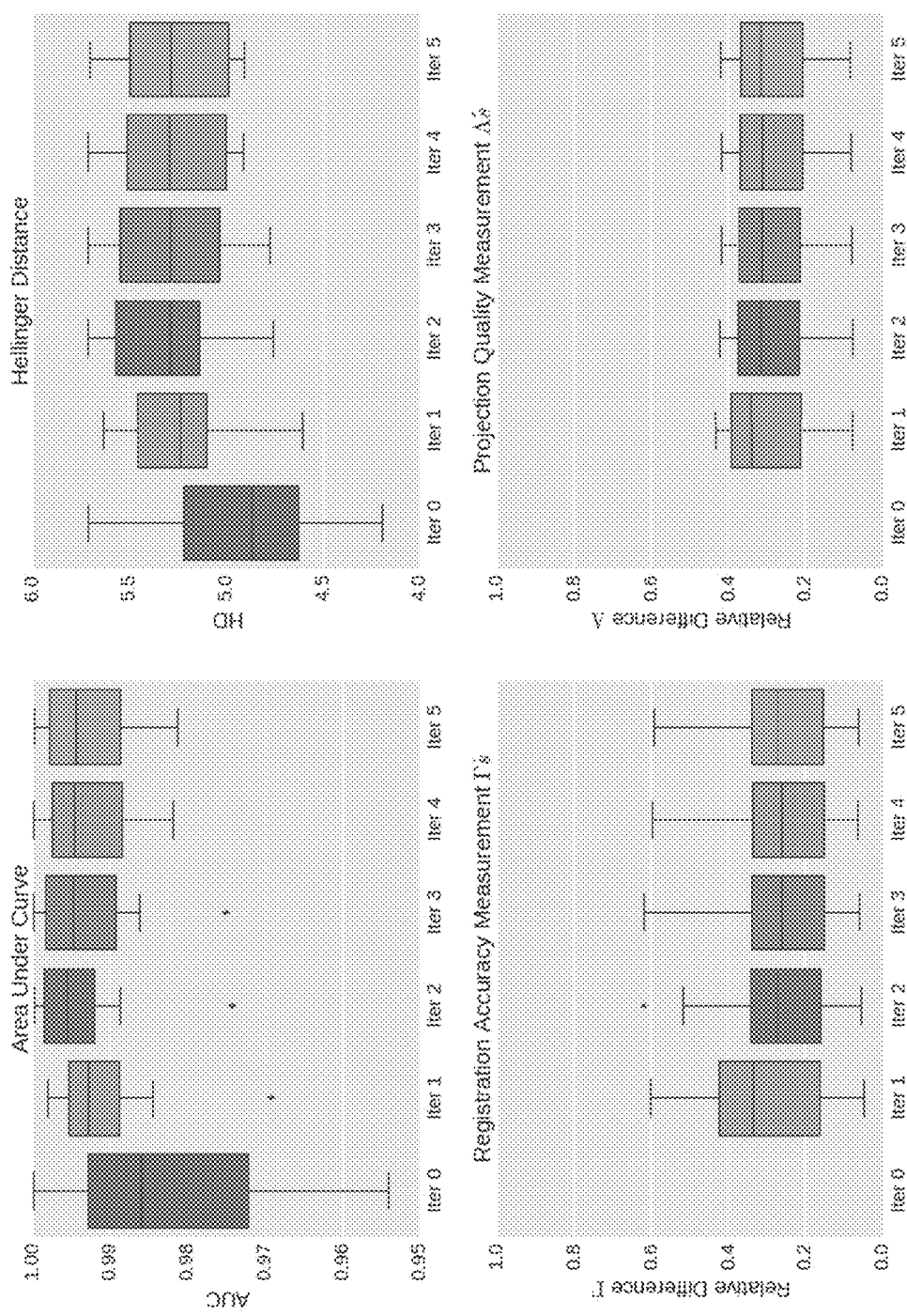
FIG. 7 is a diagram illustrating Box-and-Whisker plots.

FIG. 7 is a diagram illustrating Box-and-Whisker plots showing the discriminative power and registration accuracy of the output along the iterations. The top left panel shows the AUC of the abnormality map at each iteration. The top right panel show the HD between $P_1$ and $P_1$. The bottom two panels show the relative distance $\Gamma_n^k$ and $\Lambda_k$, respectively.

The statistics for the four aforementioned measures are summarized in separate panels in FIG. 7. We also include AUC and HD for $\mathcal{AM}_0$, the initial abnormality map derived using both intensity-based and shape-based information. From FIG. 7 we observe a converging trend for all four measurements as the number of iterations increases. In particular, their medians stabilize after the second iteration. The box plots show clear improvement for the HD, as well as a decreasing pattern for both $\Gamma_n^k$ and $\Lambda_k$ along the iterations. The AUCs of the abnormality maps peak at the second iteration, and degrade slightly onwards. However, the AUC medians differ by less than 0.0001 between the second and the final iteration and this difference is not statistically significant.

Figure 8:
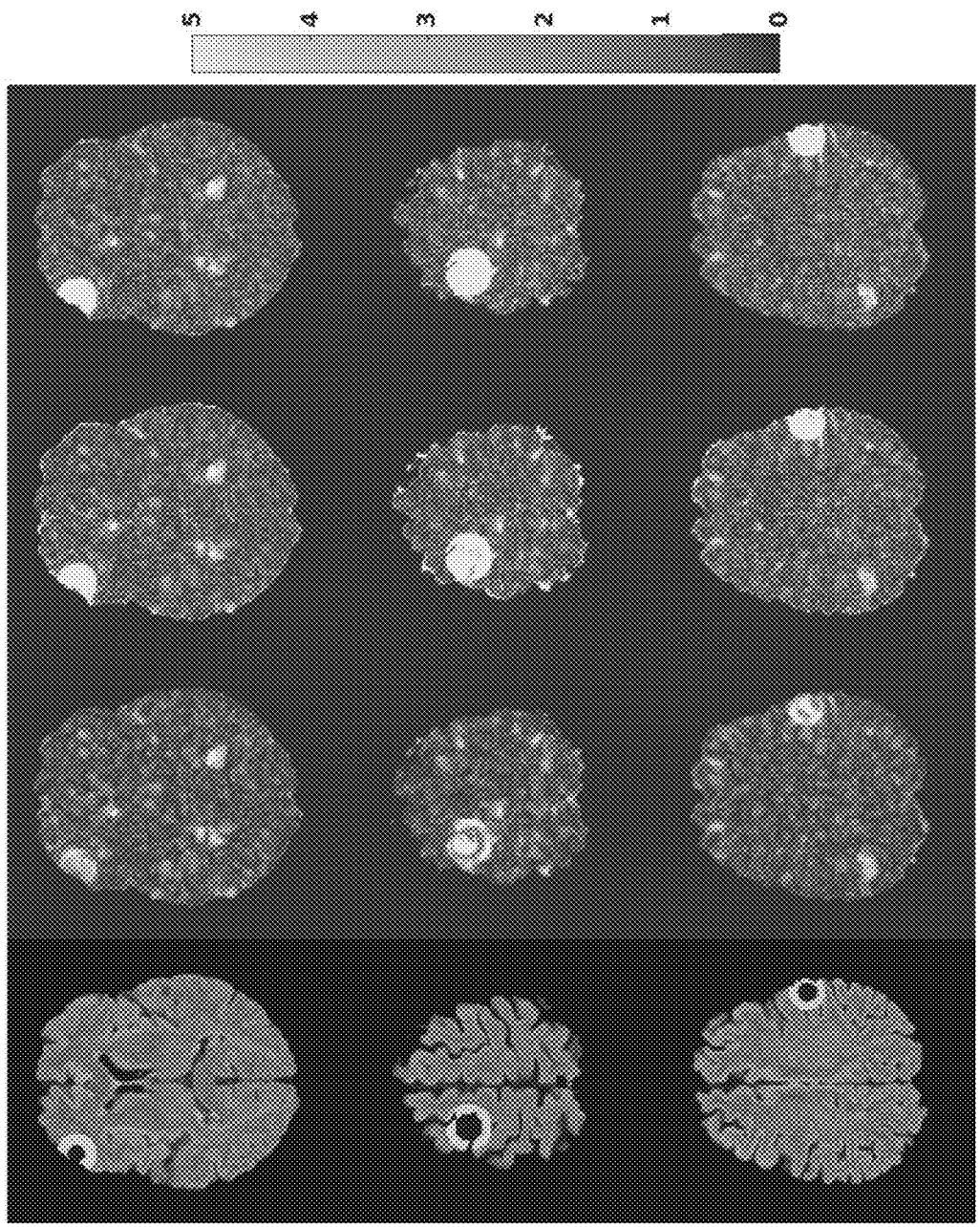
FIG. 8 is a diagram illustrating representative axial slices along with corresponding abnormality maps at various iterations.

A visual inspection reveals greater details on how the outputs progress with the number of iterations. FIG. 8 is a diagram illustrating representative axial slices along with corresponding abnormality maps at various iterations. In FIG. 8, from left to right, FLAIR image slices, initial abnormality maps, abnormality maps at iteration 1 and abnormality maps at iteration 2 are depicted.

We show the abnormality maps qualitatively by presenting three axial slices in FIG. 8. The initial abnormality maps, together with abnormality maps at iteration 1 and 2, are plotted alongside FLAIR image slices. In all three cases, the lesion regions are better delineated as the number of iterations increases. In particular, the initial abnormality maps fail to cover the entire lesion region and under-segment the abnormalities. The missing parts are successfully filled in by the following iterations, leading to more accurate lesion detection. This behavior is also observed in cases not shown here.

Next we compare the output of Algorithm 1 with that of three registration schemes: direct affine registration (AR), direct deformable registration (DR) and deformable registration with cost function masking (DRM). AR with CFM is not included as in our experiments the scale of the abnormalities is not sufficiently large to influence affine registration. To ensure a fair comparison between the proposed method (DRI, I for inpainting) and DRM, we use $\mathcal{BM}_4$, the abnormality mask estimated at the penultimate iteration, as the input for CFM. As before, we start by examining the registration accuracy. The warped images by the proposed scheme are denoted by $\mathcal{I}_n^{DRI}$. The warped images by the other three candidates are denoted by $\mathcal{I}_n^{AR}$, $\mathcal{I}_n^{DR}$, and $\mathcal{I}_n^{DRM}$, respectively. The same image batch from NC is recycled from the previous experiment for validation. We continue to measure registration accuracy by the relative difference $\Gamma^{(\bullet)}$ between $\mathcal{I}_n^{(\bullet)}$ and $\mathcal{I}_n^G$ within the lesion regions.

Figure 9:
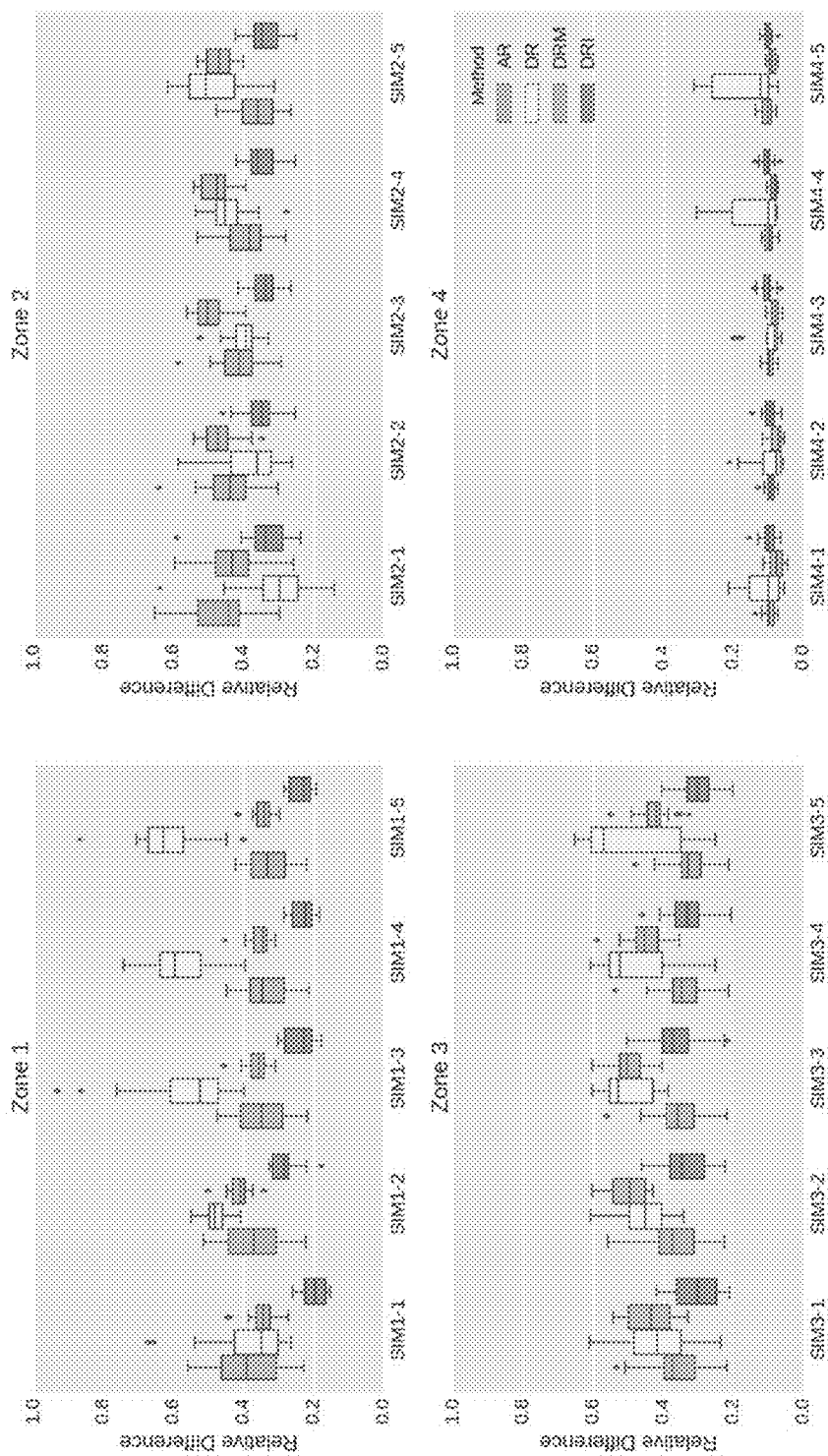
FIG. 9 is a diagram illustrating box plots depicting results grouped by zone.

FIG. 9 is a diagram illustrating box plots depicting results grouped by zone. In FIG. 9, the box plots depict the relative differences $\Gamma_n^{Method}$ for the competing methods. SIMi-j denotes the case where lesions are simulated at Zone i with size j, where larger j signifies larger abnormalities. The Zone indexing is consistent with what is shown in FIG. 2.

FIG. 9 summarizes the results on the twenty simulated images. The results are grouped by lesion zones. We observe the best performance for all candidate methods in cases where lesions are simulated in the deep white matter (Zone 4). This indicates that DRAMMS does not try to aggressively match normal anatomy to the simulated infarcts in Zone 4. All methods achieve comparable median differences, with DR being the least consistent, as suggested by its larger upper quartile values.

Not surprisingly, AR performs stably with respect to the scale of the abnormalities. In fact, the relative differences tend to decrease as lesion size grows. This is expected since the underlying matching criterion is global and the transformation model has only 12 degrees of freedom. In contrast, DR is highly sensitive to the location and size of the abnormalities. Its performance drops drastically as we increase the size of the abnormalities that are simulated in cortical regions (Zone 1, 2 and 3). DRM does not share the same issue; its performance does not degrade with increasing lesion size, even when the provided mask is merely an estimate of the ground truth. Incorporating CFM with deformable registration also tightens the inter-quantile range of the relative differences. However, one only observes the benefit of CFM in terms of median difference when the lesion size surpasses a certain threshold. For example in Zone 3, DRM starts to outperform DR from the intermediate size onwards. Meanwhile in Zone 2, it compares unfavorably to its vanilla counter part until the lesion size reaches the largest value.

DRI produces competitive results throughout this experiment. In particular, it achieves the lowest median difference in 13 out of the 15 cases with cortical lesions, except for SIM2-1 and SIM3-3, where its median is slightly higher than that of DR and AR, respectively. DRI clearly outperforms DRM ($p<10^{-40}$) under the Wilcoxon signed-rank test) in cases with cortical lesions, which demonstrates the premise of using an inpainting step such as (6) for matching normative images to images with abnormalities.

Figure 10:
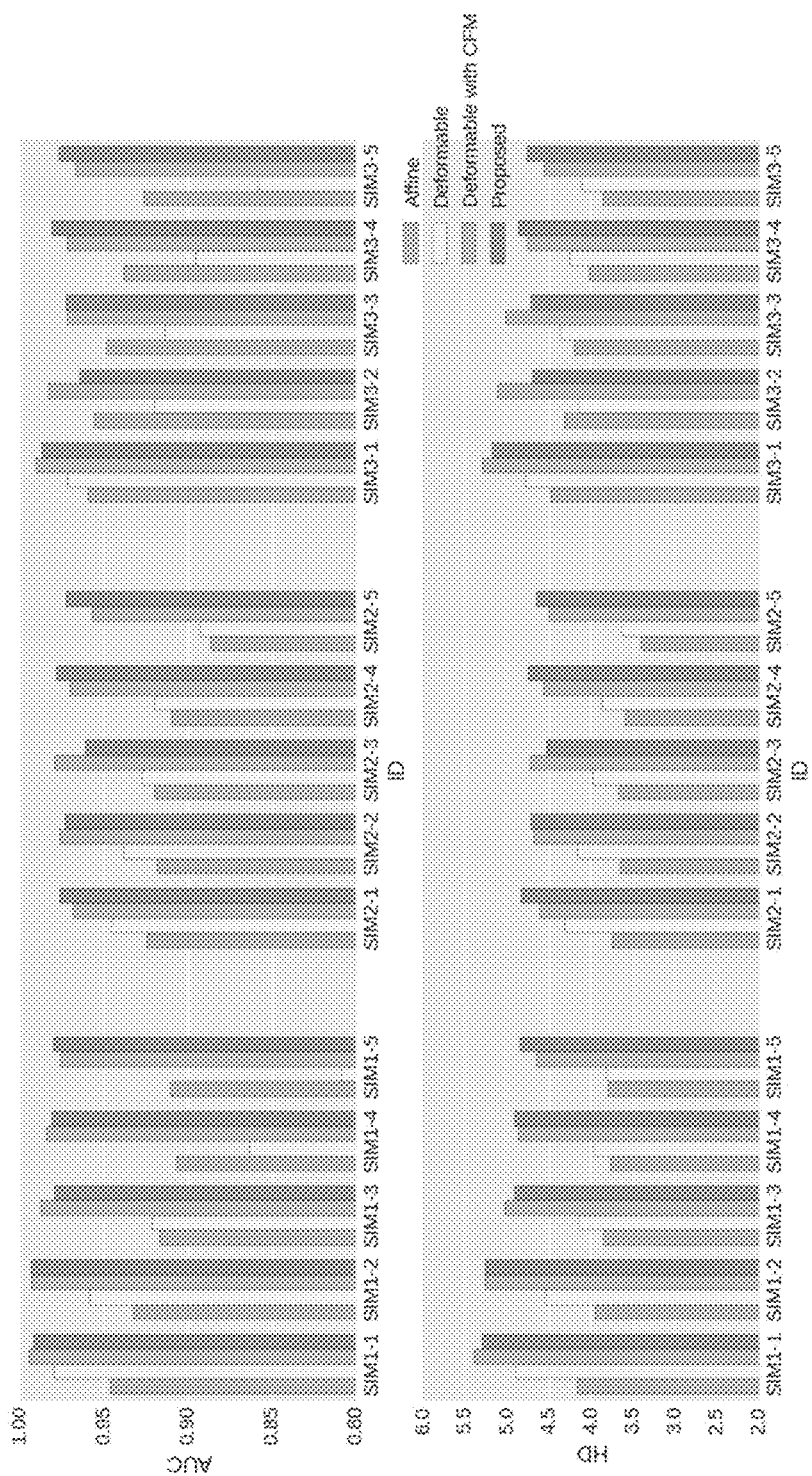
FIG. 10 is a diagram illustrating a bar-plot comparing area under curve (AUC) and Hellinger distance (HD) between four competing methods.

We revisit AUC and HD for evaluating detection accuracy, but this time we compare the proposed method to those of the three other competitors. All methods achieve AUCs that are higher than 0.999 for the five samples in Zone 4. FIG. 10 showcases the results for the other cases.

FIG. 10 is a diagram illustrating a bar-plot comparing AUC and HD between four competing methods. DRI and DRM achieve comparable performance in AUC and HD. The difference between these two methods is not statistically significant under the Wilcoxon signed-rank test ($p=0.82$ and $p=0.86$ for AUC and HD, respectively). DRI and DRM substantially outperform AR and DR. The differences between {DRI, DRM} and {AR, DR} are statistically significant, with $p<10^{-4}$ for all pairwise comparisons. The detection performance of affine and deformable registration both degrade with increasing lesion size, with deformable registration decaying at a faster speed. One may conclude that AR is insufficient for the proposed regional learning scheme in this simulated experiment, and DR needs to couple with CFM or inpainting for reliable performance.

Figure 11:
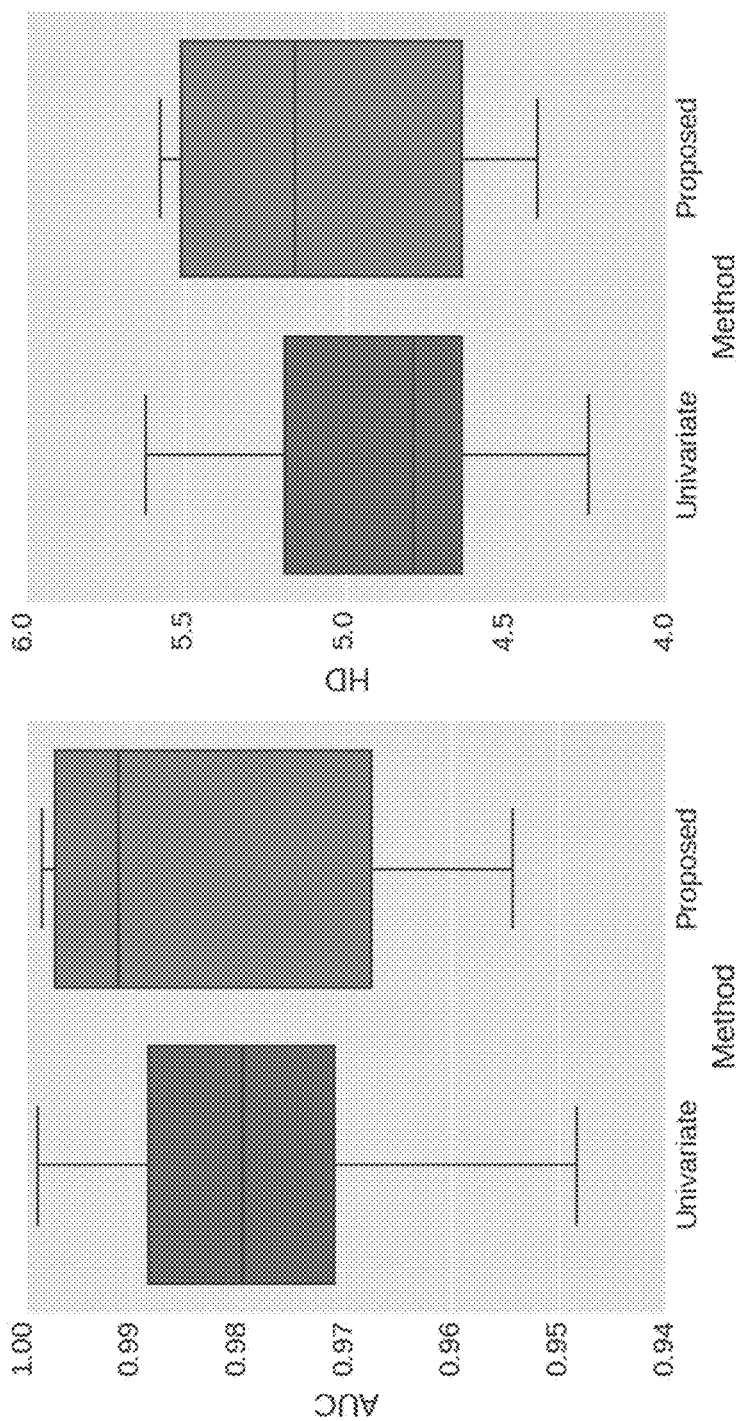
FIG. 11 is a diagram illustrating a box plots comparing AUC and HD between univariate statistical maps and abnormality maps computed using a method described herein.

As the last synthetic experiment, we evaluate the performance of the proposed multi-variate method against a standard uni-variate statistical test. We fix the registration as the "ground truth" used in previous experiments, that is, the training database $\{\mathcal{I}_1, \ldots, \mathcal{I}_N\}$ warped to the subject space with the reference image being $\mathcal{I}^G$ (the base image on which the abnormalities are simulated). We again denote by $\{\mathcal{I}_1^G, \ldots, \mathcal{I}_N^G\}$ the warped images. The uni-variate statistics are computed as the Crawford-Howell t-statistics of $\mathcal{I}^S$ against $\{\mathcal{I}_1^G, \ldots, \mathcal{I}_N^G\}$. The uni-variate statistical parametric maps are then compared to the abnormality maps generated by DRI in terms of AUC and HD. Both methods achieve AUCs that are consistently higher than 0.995 for the 5 images where infarcts are simulated in the deep white matter (Zone 4). The results for the remaining 15 cases are summarized in the box plots shown in FIG. 11. FIG. 11 is a diagram illustrating box plots comparing AUC and HD between univariate statistical maps and abnormality maps computed using a method described herein. We observe a statistically difference for both AUC and HD (p<0.05 and p<0.01, respectively).

3.4 Experiment on Clinical Data: Brain Lesions

We now turn to the experiments on clinical data. As detailed in Sec. 3.1, TestSet1 involves images from 14 patients with white matter lesions and/or cortical infarcts, Periventricular hyper-intensities are the dominant abnormality type in 9 out of the 14 patients, a pathology that is also present in NC. TestSet2 involves elder subjects that are 15 years older, on average, than the subjects in the training database. In other words, NC is not an age-appropriate training database for TestSet2, and we expect that age-related differences, such as cortical atrophy and ventricular enlargement, would be identified as abnormal by our statistical framework.

There are two inherent difficulties when experimenting with the given clinical database. First of all, assessing registration quality is no longer possible due to the lack of a ground truth. Furthermore, the presence of periventricular lesions in NC and the age-difference between NC and TestSet2 indicate that deviations from NC will not entirely match the lesions that are present in TestSet1 and TestSet2. As a consequence, we expect these factors to act as confounders and compromise the ability of the abnormality detectors to separate lesions from normal tissues. However, this behavior is desirable as the proposed method constitutes a generic abnormality detection framework that does not specifically target lesion delineation.

We use parameters identical to the ones used in the simulated experiments, except that we now terminate Algorithm 1 after two iterations. Different from the simulated scenario, we use T1 images for registration and FLAIR images for detection. T1 images are routinely collected, characterized by high tissue contrast and high resolution, making them very suitable for fine registration. Similar to FLAIR, lesions appear distinct from normal tissues in T1 images and pose similar challenges to registration [4]. We continue using AUC and HD to quantify discriminative power. The proposed method is compared to AR and DR. As the simulated experiment shows that DRI outperforms DRM in registration but behaves similarly in detection, we exclude DRM in this experiment as registration quality can not be measured for the clinical database.

Figure 12:
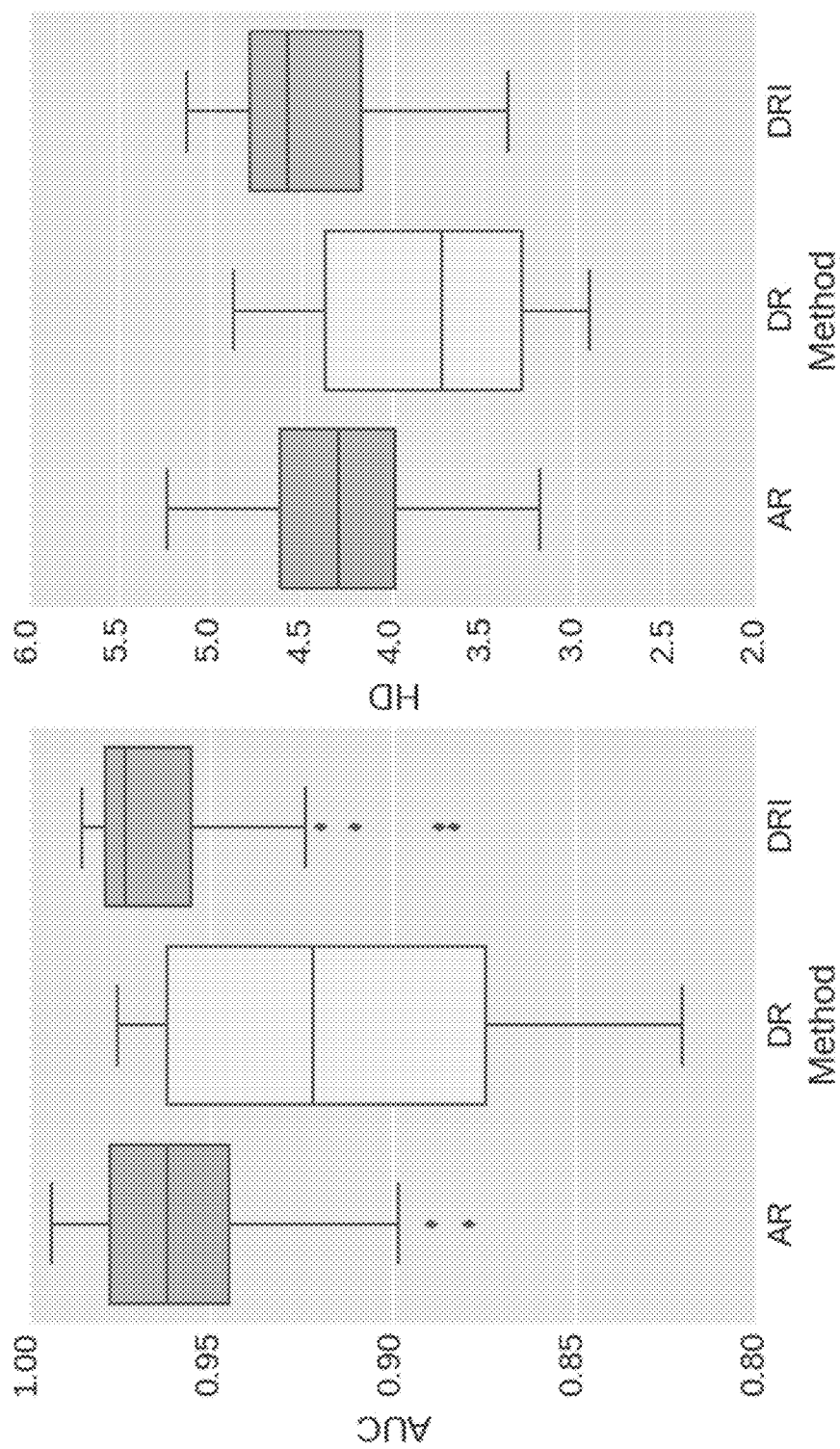
FIG. 12 is a diagram illustrating box plots comparing AUC and HD between various methods for a clinical dataset.

FIG. 12 is a diagram illustrating box plots comparing AUC and HD between various methods for a clinical dataset. The box plots shown in FIG. 12 summarize the statistics for the candidate methods. DRI achieves the highest median both in AUC and HD. AR follows closely as the second best method, while DR performs worse than its competitors. Under the Wilcoxon signed-rank test, AR and DRI both perform significantly better than DR ($p<10^{-4}$). The difference between AR and DRI is not as substantial but remains statistically significant, with $p<0.05$ and $p<0.01$ for AUC and HD, respectively.

Figure 13:
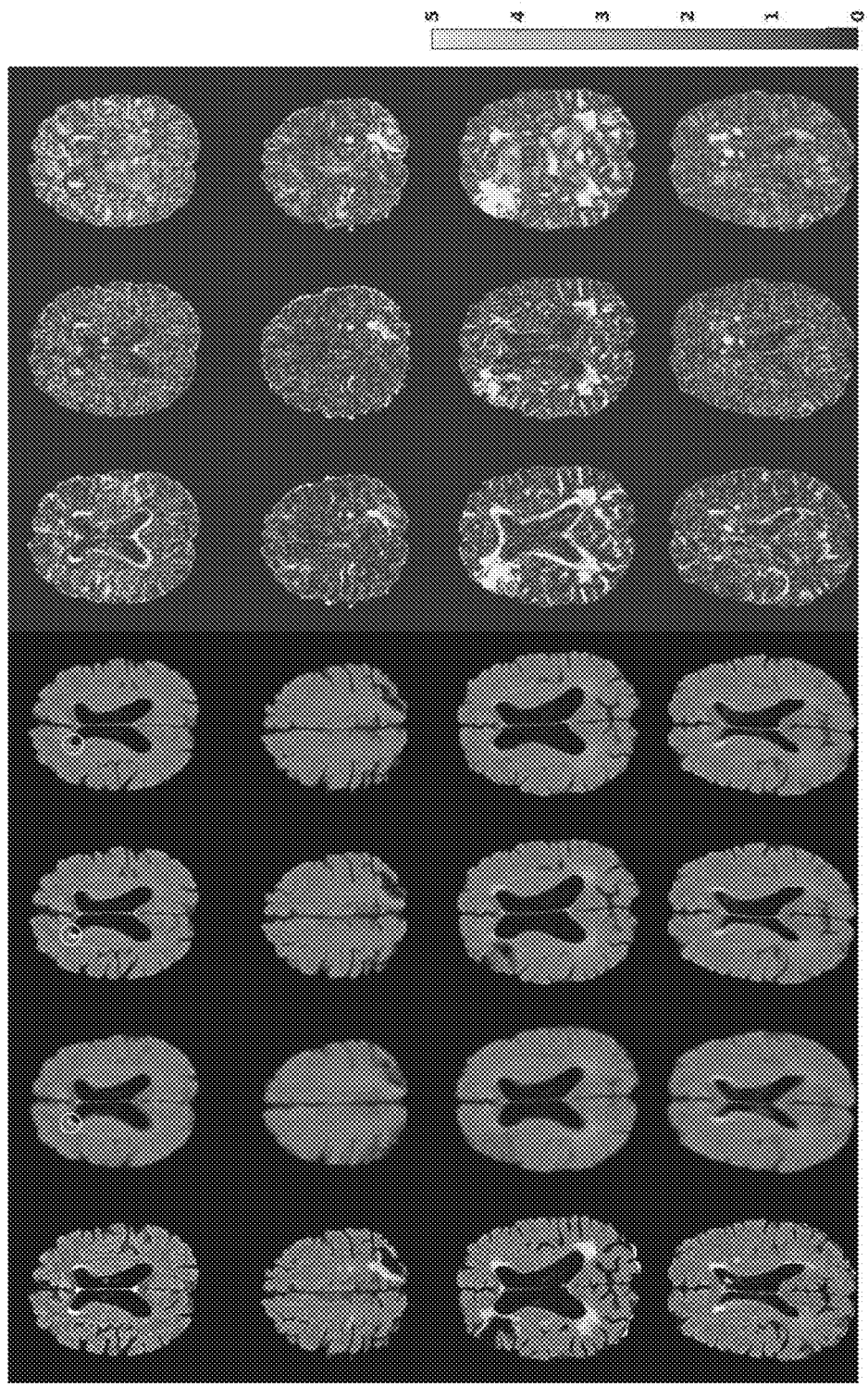
FIG. 13 is a diagram illustrating examples showing the effect of block size on decomposition results.

We qualitatively evaluate the methods by visually inspecting the outputs. FIG. 13 shows axial slices from four representative cases. For each method, we show the normal projection and abnormality map. Overall, the projection images based on deformable registrations are substantially sharper than the ones based on affine registration. This is hardly surprising as finer registration leads to better localized dictionary $A_s$. FIG. 13 also shows that the projection images computed from DR and DRI have highly similar appearance outside the lesion regions, implying that the inpainting steps primarily affect the abnormal parts of the brain.

Let us focus our visual inspection on lesion areas in the brain. One immediately notices that most periventricular bright lesions are (at least partially) preserved in the projections, which is the result of their presence in the normative dataset. Examples of this behavior are marked by the green circles in row 1. When viewing the abnormality maps, one notices that bright lesions are more salient in the AR and DRI maps, and they appear less notable in the DR maps. We mark instances of such differences by red circles in row 1.

We next inspect the cortical infarcts that are present in rows 2 and 3. In row 2, the necrosis is largely preserved in the DR projection, because the training samples have been "distorted" to match the patient's image. Both AF and DRI are able to partially recover the lost tissues, with DRI is able to generate a sharper projection. A similar observation can be made for the subject shown in row 3. Both AF and DRI successfully recover the entire necrotic part of the infarct with DRI producing a shaper image, while DR only fills in part of the necrosis. The abnormality maps highly correlate with the normal projections. In particular, necroses appear more salient in the abnormality maps when tissues are better recovered in the projections.

FIG. 13 also sheds light on why AR outperforms DR in this experiment. Although DR better matches normal regions in the training subject to normal regions in the test subject, thus producing sharper projections than AR, it also matches normal regions in the training subject to lesions in the test subject in an aggressive way. The aggressive matching "abnormalizes" the dictionaries used in the subsequent detection step, making DR insensitive to lesions.

Aside from lesions, sulcus is one of the dominant regions that may be identified as abnormal. One may observe instances of sulci flagged as abnormal by all three detectors, with AR being the most aggressive and DR being the most conservative. However, it is difficult to judge which method makes better decisions. On the one hand, the detector might flag sulci as abnormal because the underlying model fails to capture the complex normative variation in the cortex. On the other hand, the flagged sulci might indicate actual cerebral atrophy. In the second case, the atrophy might be caused by normal aging, injuries or other diseases.

Ventricles may also be identified as abnormal, which can be seen in row 1 and row 3. DR is insensitive to ventricular differences, as direct deformable registration accurately matches ventricle shapes between the normal samples and the patient's image, even when the latter's ventricle is substantially enlarged. AR and DRI signify enlarged ventricles in distinct ways. Affine registration fails to match the shape of the ventricles, thus flags the misalignment as pathological. In DRI, the high abnormality scores in the ventricles come from the shape-based maps that are computed using the log Jacobian determinant. As a result, they appear much more diffused, spreading throughout the ventricles rather than clustering around the borders.

FIG. 13 is a diagram illustrating visual depictions of outputs of various methods. In FIG. 13, each row depicts axial slices from one representative subject in the clinical database. From left to right: FLAIR image slice, AR projection, DR projection, DRI projection, AR abnormality map, DR abnormality map and DRI abnormality map.

3.5 Case Example: Alzheimer's Disease

In this section, we present additional experimental results on Alzheimer's disease (AD) patients to demonstrate the generality of the proposed framework. In particular, T1 scans from a population of healthy older adults along with a cohort of AD patients are pre-processed using a previously validated and published pipeline [14], producing regional tissue volumetric (RAVENS) maps that allow us to quantify the amount of brain tissues in the vicinity of each voxel. The RAVENS maps are normalized by individual intracranial volume to adjust for global differences in intracranial size, and are smoothed to incorporate neighborhood information using a 5-mm Full Width at Half Maximum Gaussian filter.

The proposed framework is applied to the log Gray Matter-RAVENS maps for abnormality detection. As all RAVENS maps reside in the same standardized template space (atlas) by definition, we only need to perform the detection part of the framework. Specifically, the log GM-RAVENS maps are decomposed through the constraint version (P2-C), following the same parameters as the ones used to decompose the logJacDet $\mathcal{J}$'s, except that the block size is set to 8 mm×8 mm×8 mm.

Figure 14:
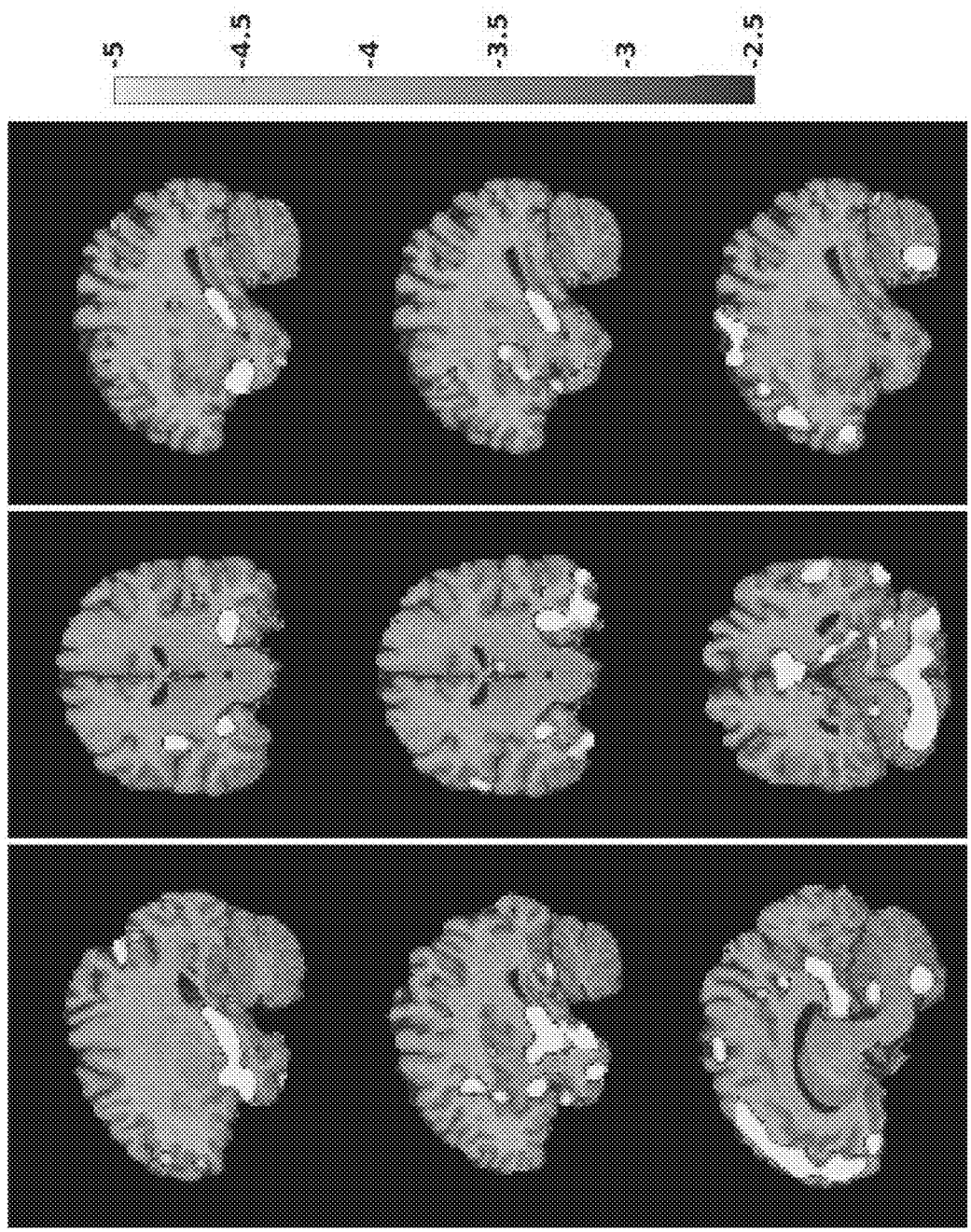
FIG. 14 is a diagram illustrating visual depictions of results on Alzheimer's disease (AD) patients.

Since this experiment was merely designed for demonstrating the generality of our approach beyond lesion-like abnormalities, we only performed a qualitative evaluation of the method based on FIG. 14, in which representative examples of the abnormality maps were displayed. The abnormality maps have been thresholded at $t \leq -2.5$ before being overlaid on the atlas. A highly negative abnormality score at a given voxel indicates substantial loss of gray matter around that voxel. FIG. 14 shows abnormality map slices from three AD subjects. The hippocampus regions of subject 1 and 2 (shown in row 1 and 2, respectively) are salient in the abnormality maps with extremely negative scores, which is consistent with the typical pattern of atrophy found in AD. Interestingly, this is not the case for the subject shown in row 3, where the hippocampus is not at all salient in the abnormality map. Instead, a pronounced frontal and cerebellar atrophy pattern is detected by the proposed method. It is conceivable that either this patient had a different underlying pathology that was clinically manifested as an AD phenotype, or some co-existing pathology to AD pushed this individual beyond the threshold of clinical AD for smaller levels of hippocampal atrophy. Regardless of the (unknown) underlying ground truth, this example demonstrates the potential clinical utility of the proposed approach as a means for constructing visual representations of abnormalities to be further evaluated by clinicians along with other variables.

FIG. 14 is a diagram illustrating visual depictions of results on AD patients. In FIG. 14, each row depicts three representative slices of the abnormality map from one subject. The abnormality maps are overlaid on the atlas. From left to right: a sagittal slice (left hemisphere), a coronal slice, and another sagittal slice (right hemisphere).

4 Discussion

We have presented an abnormality detection framework that is based on a generic formulation. The framework makes minimal assumptions on the characteristics of the abnormalities and potentially targets a wide range of pathologies. The method can utilize both intensity and shape information from the image to capture abnormalities from multiple perspectives. All image features on the 3-d grid, treated as a collection of overlapping local blocks, are processed in a unified way. They are decomposed into a normal part and a residual part using joint basis-pursuit, after which abnormalities are identified as statistically significant areas in the residual. The method can also incorporate an iterative registration and detection scheme aiming to tackle registration and detection simultaneously. At each iteration, the robustness and accuracy of the registration can improve by leveraging the detection outcome. The registration improvement in turn can benefit subsequent detection steps.

The proposed framework may be modified and generalized in many ways. For instance, only the Jacobian determinant is used as a feature for detecting abnormalities in the deformation field. One may perform statistical learning, using the same method, on other aspects of the deformation field (divergence, curl etc.), or on the deformation field itself. One may also perform a sample selection procedure prior to registering the training database to the subject, similar to the atlas selection process in multi-atlas segmentation [1]. The extension to a multi-modal setting is straightforward, at the expense of higher computational load. For example, one could apply the method to each modality separately and fuse the results. The proposed framework is also flexible. In fact, the decomposition (P2) may be tailored to the specific applications, as is done in (P2-C). Moreover, one could replace DRAMMS by any other registration method of his/her choice. Last but not least, the abnormality map could potentially be used as prior information (and/or features) by specific detectors to boost the their performance.

The proposed framework can be useful in various clinical scenarios. For instance, the abnormality maps can be used for automated screening of scans by flagging the ones with abnormalities that need further expert attention. Along the same lines, and for more subtle abnormalities, a tool for directing the attention of expert readers towards regions displaying relatively large deviation from normality would be quite helpful. For example, the abnormalities present in Alzheimer's Disease patients, such as hippocampal atrophy and posterior cingulate hypometabolism, would not qualify as a "lesion". Nonetheless, we have shown that a 3-D abnormality map produced by the proposed approach could help as a computationally derived image of brain atrophy, both for visual assessment and as a quantitative assay.

In some embodiments, a representative framework described herein may be computationally intensive, e.g., as one needs to register a entire database to a test image. The computational burden may be alleviated by the aforementioned sample selection procedure, or by using faster, but less accurate, registration methods. These alternatives may have a negative impact on detection accuracy, the details of which are left to a future study. Secondly, the method is sensitive to age and scanner differences, as are most statistical learning approaches. For lesion detection, the training database may be age appropriate for the test image and may be acquired using the same imaging protocol. If such requirements fail to be met, confounding factors (e.g. age and scanner differences) may compromise the performance of the method on detecting lesions. Thirdly, the registration part of the framework relies on cost function masking and image inpainting, which may not account for substantial tissue displacements around certain types of lesions (e.g. tumors). As a result, simultaneous detection and registration, especially the latter component, may not be tackled by the framework in its current form for those lesions. In a future work we plan to extent CFM by exploiting more advanced growth models (e.g. the ones proposed in [15, 18, 30]). Lastly, while the proposed method is built upon a generic formulation that is not limited by a specific application, it is validated mainly on brain lesion MRI data in the subject matter described herein. Future work will leverage its potential in applications involving other anatomical regions, image modalities and abnormality types.

It is important to note that a generic approach as such is not meant as a substitute, but rather a complement to the abundant specialized methods. In particular, a generically formulated method may not reach the accuracy of a specifically trained model when applied to the pathology the latter targets. Its main advantage lies in the potential to produce solid results on a wider class of abnormalities. In practice, a choice could be made based on how one wishes to balance generality and specificity in a particular application.

Figure 15:
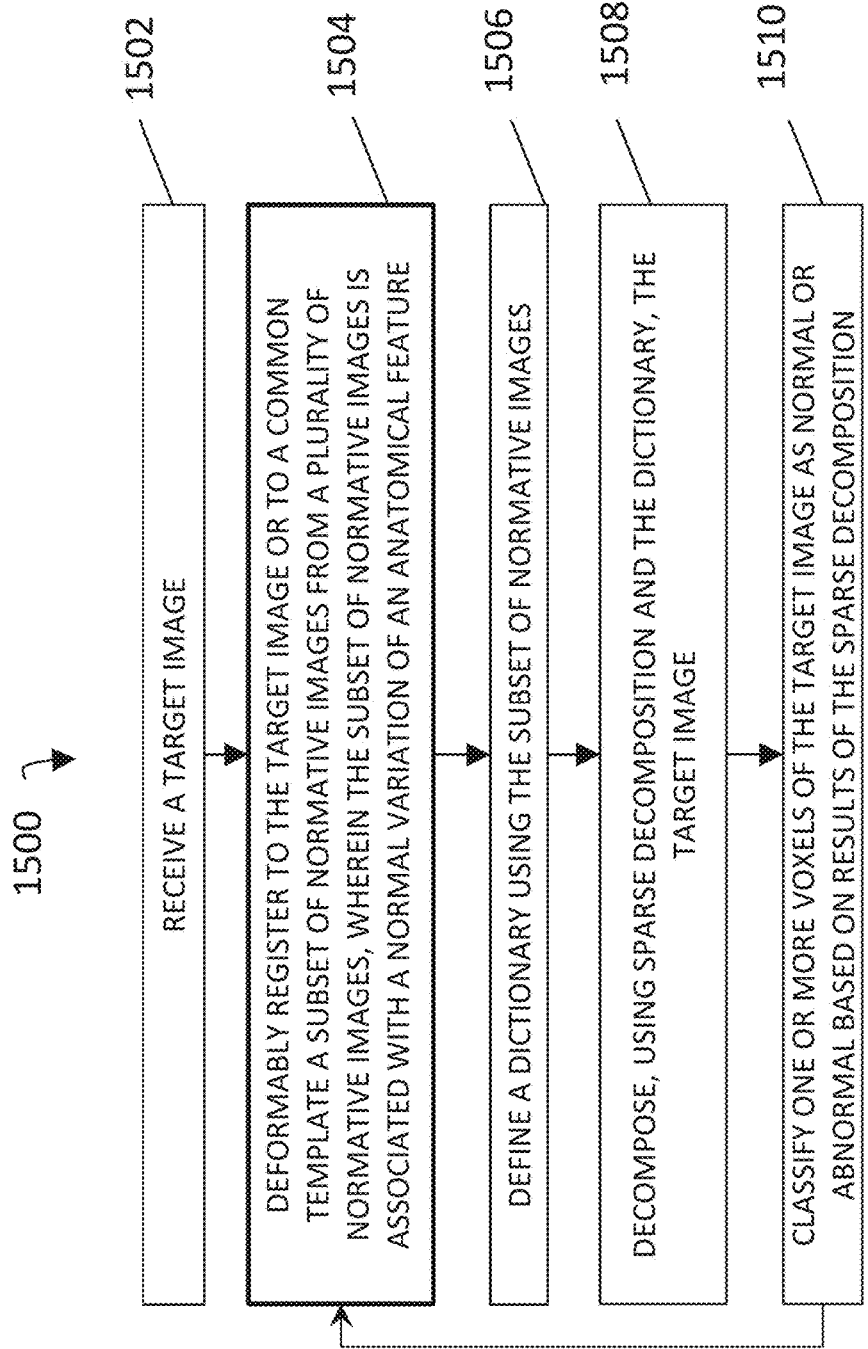
FIG. 15 is a diagram illustrating another exemplary process for automated abnormality detection according to an embodiment of the subject matter described herein.

FIG. 15 is a diagram illustrating another exemplary process for automated abnormality detection according to an embodiment of the subject matter described herein. In some embodiments, exemplary process 1500, or portions thereof, may be performed by or at computing platform 100 (e.g., a medical image analysis device or a computer), ADM 102, and/or another node or module. In some embodiments, exemplary process 1500 may include steps 1502, 1504, 1506, 1508, and/or 1510.

In step 1502, a target image may be received. For example, the target image may be a medical image of an anatomical feature (e.g., a body part or organ).

In step 1504, a subset of normative images from a plurality of normative images may be deformably registered (e.g., spatially aligned) to the target image or a common template, wherein the subset of normative images is associated with a normal variation of an anatomical feature. For example, assuming a target image is associated with a lung, the normative subset may consist of images of various healthy or normal lungs.

In step 1506, a dictionary is defined using the subset of normative images. In some embodiments, defining a dictionary may include identifying a subset of images associated with a same or similar spatial location as the target image. For example, assuming a target image is associated with a particular area of a lung, a dictionary may be defined that includes images of that particular area of different lungs, e.g., lungs associated with different people than the lung in the target image. Such spatial identification is enabled through the registration step 1504.

In step 1508, the target image may be decomposed using sparse decomposition and the dictionary. For example, ADM 102 may be configured to decompose the target image into a normal component and a residual component using the dictionary and a sparse decomposition technique discussed herein.

In some embodiments, using sparse decomposition may include performing l1-norm minimization to identify a normal component and a residual component in the target image.

In step 1510, one or more voxels of the target image (or a residual component of the target image) may be classified as normal or abnormal based on results of the sparse decomposition. For example, a voxel of the target image may be given an abnormality score and/or classified as normal or abnormal based on results of the sparse decomposition. The abnormality score and/or the classification results may be the final output, or may be fed back to the spatial alignment step. In the latter case, ADM 102 may be configured to use the classification results from step 1510 to guide the registration (step 1504), forming an iterative registration-detection procedure for generating an abnormality map at each of a plurality of successively higher (e.g., finer) resolution levels. In this example, each abnormality map may or may not indicate an abnormality in a related target image.

In some embodiments, ADM 102 and/or another entity may be configured to generate at least one abnormality score associated with at least one voxel of a target image based on a sliding windowing scheme with overlapping patches.

In some embodiments, ADM 102 and/or another entity may be configured to generate an image-based abnormality map after each of a plurality of successively higher (e.g., finer) resolution levels.

In some embodiments, a plurality of images (e.g., usable to define a dictionary) may include a 2D image, an x-ray, a tomogram, an ultrasound image, a thermal image, an echocardiogram, an MRI, a 3D image, a CT image, a photoacoustic image, an elastography image, a tactile image, a PET image, and/or SPECT image.

In some embodiments, a plurality of images (e.g., usable to define a dictionary) may include normal anatomical or functional variations for one or more portions of a biological system.

In some embodiments, a biological system (e.g., associated with a dictionary) may include an anatomical feature, a skeletal system, a muscular system, an integumentary system, a nervous system, a cardiovascular system, an endocrine system, a respiratory system, a urinary system, an excretory system, a reproductive system, a digestive system, a lymphatic system, a brain, a stomach, a heart, a lung, a bladder, a liver, a kidney, skin, an eye, a bone, an organ, or a body part.

The disclosure of each of the following references is hereby incorporated herein by reference in its entirety.

REFERENCES

[1] P. Aljabar, R. Heckemann, A. Hammers, J. Hajnal, and D. Rueckert,
Multi-atlas based segmentation of brain images: Atlas selection and its effect on accuracy), NeuroImage, 46 (2009), pp. 726-738.

[2] S. M. Andersen, S. Z. Rapcsak, and P. M. Beeson, Cost function masking during normalization of brains with focal lesions: Still a necessity?, NeuroImage, 53 (2010), pp. 78-84.

[3] S. Boyd, N. Parikh, E. Chu, B. Peleato, and J. Eckstein, Distributed optimization and statistical learning via the alternating direction method of multipliers, Foundations and Trends® in Machine Learning, 3 (2011), pp. 1-122.

[4] M. Brett, A. P. Leff, C. Rorden, and J. Ashburner, Spatial normalization of brain images with focal lesions using cost function masking, NeuroImage, 14 (2001), pp. 486-500.

[5] S. Chen, D. Donoho, and M. Saunders, Atomic decomposition by basis pursuit, SIAM Journal on Scientific Computing, 20 (1998), pp. 33-61.

[6] Y. Choi and S. Lee, Injectivity conditions of 2d and 3d uniform cubic b-spline functions, Graphical Models, 62 (2000), pp. 411-427.

[7] J. R. Crawford and P. H. Garthwaite, Testing for suspected impairments and dissociations in single-case studies in neuropsychology: evaluation of alternatives using monte carlo simulations and revised tests for dissociations., Neuropsychology, 19 (2005), p. 318.

[8] M. Elad, Sparse and Redundant Representations: From Theory to Applications in Signal and Image Processing, Springer, 2010.

[9] M. Elad, M. A. T. Figueiredo, and Y. Ma, On the role of sparse and redundant representations in image processing, Proceedings of the IEEE, 98 (2010), pp. 972-982.

[10] G. Erus, E. I. Zacharaki, and C. Davatzikos, Individualized statistical learning from medical image databases: Application to identification of brain lesions, Medical Image Analysis, 18 (2014), pp. 542-554.

[11] V. Fonov, A. C. Evans, K. Botteron, C. R. Almli, R. C. McKinstry, and D. L. Collins, Unbiased average age-appropriate atlases for pediatric studies, NeuroImage, 54 (2011), pp. 313-327.

[12] D. Garcia-Lorenzo, S. Francis, S. Narayanan, D. L. Arnold, and D. L. Collins, Review of automatic segmentation methods of multiple sclerosis white matter lesions on conventional magnetic resonance imaging, Medical Image Analysis, 17 (2013), pp. 1-18.

[13] C. R. Gillebert, G. W. Humphreys, and D. Mantini, Automated delineation of stroke lesions using brain CT images, NeuroImage: Clinical, 4 (2014), pp. 540-548.

[14] A. Goldszal, C. Davatzikos, D. Pham, M. Yan, R. Bryan, and S. Resnick, An image processing protocol for the analysis of mr images from an elderly population, J Comput Assist Tomogr, 22 (1998), pp. 827-837.

[15] A. Gooya, K. Pohl, M. Bilello, L. Cirillo, G. Biros, E. Melhem, and C. Davatzikos, Glistr: Glioma image segmentation and registration, Medical Imaging, IEEE Transactions on, 31 (2012), pp. 1941-1954.

[16] N. Gordillo, E. Montseny, and P. Sobrevilla, State of the art survey on MRI brain tumor segmentation, Magnetic Resonance Imaging, 31 (2013), pp. 1426-1438.

[17] R. Harmouche, N. Subbanna, D. Collins, D. Arnold, and T. Arbel, Probabilistic multiple sclerosis lesion classification based on modeling regional intensity variability and local neighborhood information}, Biomedical Engineering, IEEE Transactions on, 62 (2015), pp. 1281-1292.

[18] E. Konukoglu, O. Clatz, B. Menze, B. Stieltjes, M.-A. Weber, E. Mandonnet, H. Delingette, and N. Ayache, Image guided personalization of reaction-diffusion type tumor growth models using modified anisotropic eikonal equations, Medical Imaging, IEEE Transactions on, 29 (2010), pp. 77-95.

[19] D. D. Lee and H. S. Seung, Learning the parts of objects by non-negative matrix factorization, Nature, 401 (1999), pp. 788-791.

[20] X. Li, X. Long, P. Laurienti, and C. Wyatt, Registration of images with varying topology using embedded maps, Medical Imaging, IEEE Transactions on, 31 (2012), pp. 749-765.

[21] J. Mourão-Miranda, D. R. Hardoon, T. Hahn, A. F. Marquand, S. C. Williams, J. Shawe-Taylor, and M. Brammer, Patient classification as an outlier detection problem: An application of the one-class support vector machine, NeuroImage, 58 (2011), pp. 793-804.

[22] Y. Ou, H. Akbari, M. Bilello, X. Da, and C. Davatzikos, Comparative evaluation of registration algorithms in different brain databases with varying difficulty: Results and insights, Medical Imaging, IEEE Transactions on, 33 (2014), pp. 2039-2065.

[23] Y. Ou, A. Sotiras, N. Paragios, and C. Davatzikos, Dramms: Deformable registration via attribute matching and mutual-saliency weighting, Medical Image Analysis, 15 (2011), pp. 622-639. Special section on IPMI 2009.

[24] P. Paatero and U. Tapper, Positive matrix factorization: A non-negative factor model with optimal utilization of error estimates of data values, Environmetrics, 5 (1994), pp. 111-126.

[25] S. Periaswamy and H. Farid, Medical image registration with partial data, Medical Image Analysis, 10 (2006), pp. 452-464. Special Issue on The Second International Workshop on Biomedical Image Registration (WBIR'03).

[26] M. Prastawa, E. Bullitt, S. Ho, and G. Gerig, A brain tumor segmentation framework based on outlier detection, Medical Image Analysis, 8 (2004), pp. 275-283. Medical Image Computing and Computer-Assisted Intervention—MICCAI 2003.

[27] S. Samar, S. Boyd, and D. Gorinevsky, Distributed estimation via dual decomposition, in Proc. European Control Conference, 2007, pp. 1511-1519.

[28] S. Shen, A. Szameitat, and A. Sterr, Detection of infarct lesions from single mri modality using inconsistency between voxel intensity and spatial location; a 3-d automatic approach, Information Technology in Biomedicine, IEEE Transactions on, 12 (2008), pp. 532-540.

[29] A. Sotiras, S. M. Resnick, and C. Davatzikos, Finding imaging patterns of structural covariance via non-negative matrix factorization, NeuroImage, 108 (2015), pp. 1-16.

[30] K. R. Swanson, C. Bridge, J. Murray, and E. C. A. Jr, Virtual and real brain tumors: using mathematical modeling to quantify glioma growth and invasion, Journal of the Neurological Sciences, 216 (2003), pp. 1-10.

[31] A. Trouvé and L. Younes, Metamorphoses through lie group action, Foundations of Computational Mathematics, 5 (2005), pp. 173-198.

[32] F. van der Lijn, T. den Heijer, M. M. Breteler, and W. J. Niessen, Hippocampus segmentation in MR images using atlas registration, voxel classification, and graph cuts, NeuroImage, 43 (2008), pp. 708-720.

[33] J. Wright and Y. Ma, Dense error correction via l1-minimization, in Acoustics, Speech and Signal Processing, 2009. ICASSP 2009. IEEE International Conference on, 2009, pp. 3033-3036.

[34] J. Wright, A. Yang, A. Ganesh, S. Sastry, and Y. Ma, Robust face recognition via sparse representation, Pattern Analysis and Machine Intelligence, IEEE Transactions on, 31 (2009), pp. 210-227.

[35] E. Zacharaki and A. Bezerianos, Abnormality segmentation in brain images via distributed estimation, Information Technology in Biomedicine, IEEE Transactions on, 16 (2012), pp. 330-338.

[36] K. Zeng, G. Erus, M. Tanwar, and C. Davatzikos, Brain abnormality segmentation based on l1-norm minimization, Proc. SPIE, 9034 (2014), pp. 903409-903409-7.

[37] H. Zhang, W. Yin, and L. Cheng, Necessary and sufficient conditions of solution uniqueness in 1-norm minimization, Journal of Optimization Theory and Applications, 164 (2015), pp. 109-122.

It should be noted that computing platform 100, ADM 102, and/or functionality described herein may constitute a special purpose computing device, e.g., a medical image analyzer. Further, computing platform 100, ADM 102, and/or functionality described herein can improve the technological field of medical image analysis by using techniques, methods, and/or mechanisms for automatically detecting abnormalities in medical images using information from similar normative images.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automated abnormality detection, the method comprising:
receiving a target image;
deformably registering to the target image or to a common template a subset of normative images from a plurality of normative images, wherein the subset of normative images is associated with a normal variation of an anatomical feature;

defining a dictionary using the subset of normative images;

decomposing, using sparse decomposition and the dictionary, the target image; and classifying one or more voxels of the target image.

2. The method of claim 1 comprising:
re-aligning the subset of normative images;
re-defining the dictionary using the subset of normative images;
re-decomposing the target image using the dictionary; and
re-classifying the one or more voxels in the target image as normal or abnormal.

3. The method of claim 1 wherein using the sparse decomposition includes performing l1-norm minimization to identify a normal component and a residual component in the target image.

4. The method of claim 1 wherein defining the dictionary includes identifying a subset of images associated with a same or similar spatial location as the target image.

5. The method of claim 1 comprising:
generating at least one abnormality score associated with at least one voxel of the target image based on a sliding windowing scheme with overlapping patches.

6. The method of claim 1 comprising:
generating a shape-based abnormality score for the target image based on a Jacobian determinant, a divergence, a curl, or a feature of one or more deformation fields.

7. The method of claim 1 comprising:
generating an image-based abnormality map after each of a plurality of successively higher resolution levels.

8. The method of claim 1 wherein the plurality of images includes a two dimensional (2D) image, a projectional radiograph (x-ray), a tomogram, an ultrasound image, a thermal image, an echocardiogram, a magnetic resonance image (MRI), a three dimensional (3D) image, a computed tomography (CT) image, a photoacoustic image, an elastography image, a tactile image, a positron emission tomography (PET) image, or a single-photon emission computed tomography (SPECT) image.

9. The method of claim 1 wherein the plurality of images include normal anatomical or functional variations for one or more portions of a biological system.

10. The method of claim 9 wherein the biological system includes the anatomical feature, a skeletal system, a muscular system, an integumentary system, a nervous system, a cardiovascular system, an endocrine system, a respiratory system, a urinary system, an excretory system, a reproductive system, a digestive system, a lymphatic system, a brain, a stomach, a heart, a lung, a bladder, a liver, a kidney, skin, an eye, a bone, an organ, or a body part.

11. A system for automated abnormality detection, the system comprising:
a computing platform including at least one processor and memory, the computing platform comprising:
an abnormality detection module utilizing the at least one processor and memory, the abnormality detection module is configured to receive a target image, to deformably register to the target image or to a common template a subset of normative images from a plurality of normative images, wherein the subset of normative images is associated with a normal variation of an anatomical feature, to define a dictionary using the subset of normative images, to decompose, using sparse decomposition and the dictionary, the target image, and to classify one or more voxels of the target image as normal or abnormal based on results of the sparse decomposition.

12. The system of claim 11 wherein the abnormality detection module is configured to re-align the subset of normative images, to re-define the dictionary using the subset of normative images, to re-decompose the target image using the dictionary, and to re-classify the one or more voxels in the target image as normal or abnormal.

13. The system of claim 11 wherein the abnormality detection module is configured to perform l1-norm minimization to identify a normal component and a residual component in the target image.

14. The system of claim 11 wherein the abnormality detection module is configured to identify a subset of images associated with a same or similar spatial location as the target image.

15. The system of claim 11 wherein the abnormality detection module is configured to generate at least one abnormality score associated with at least one voxel of the target image based on a sliding windowing scheme with overlapping patches.

16. The system of claim 11 wherein the abnormality detection module is configured to generate a shape-based abnormality score for the target image based on a Jacobian determinant, a divergence, a curl, or a feature of one or more deformation fields.

17. The system of claim 11 wherein the abnormality detection module is configured to generate an image-based abnormality map after each of a plurality of successively higher resolution levels.

18. The system of claim 11 wherein the plurality of images includes a two dimensional (2D) image, a projectional radiograph (x-ray), a tomogram, an ultrasound image, a thermal image, an echocardiogram, a magnetic resonance image (MRI), a three dimensional (3D) image, a computed tomography (CT) image, a photoacoustic image, an elastography image, a tactile image, a positron emission tomography (PET) image, or a single-photon emission computed tomography (SPECT) image.

19. The system of claim 11 wherein the plurality of images include normal anatomical or functional variations for one or more portions of a biological system.

20. The system of claim 19 wherein the biological system includes a skeletal system, a muscular system, an integumentary system, a nervous system, a cardiovascular system, an endocrine system, a respiratory system, a urinary system, an excretory system, a reproductive system, a digestive system, a lymphatic system, a brain, a stomach, a heart, a lung, a bladder, a liver, a kidney, skin, an eye, a bone, an organ, or a body part.

21. A non-transitory computer readable medium having stored thereon executable instructions that when executed by at least one processor of at least one computer cause the at least one computer to perform steps comprising:
receiving a target image;
deformably registering to the target image or to a common template a subset of normative images from a plurality of normative images, wherein the subset of normative images is associated with a normal variation of an anatomical feature;
defining a dictionary using the subset of normative images;
decomposing, using sparse decomposition and the dictionary, the target image; and classifying one or more voxels of the target image as normal or abnormal based on results of the sparse decomposition.

22. The non-transitory computer readable medium of claim 21 comprising additional executable instructions that when executed by the at least one processor of the at least one computer cause the at least one computer to perform steps comprising:
   re-aligning the subset of normative images;
   re-defining the dictionary using the subset of normative images;
   re-decomposing the target image using the dictionary; and
   re-classifying the one or more voxels in the target image as normal or abnormal.

* * * * *